(12) United States Patent
Seo et al.

(10) Patent No.: US 8,854,429 B2
(45) Date of Patent: Oct. 7, 2014

(54) DISPLAY APPARATUS, 3D GLASSES, AND CONTROL METHOD THEREOF

(75) Inventors: Je-hwan Seo, Daegu (KR); Tae-don Hwang, Suwon-si (KR); Yong-jin Kang, Suwon-si (KR); Do-sung Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 11 days.

(21) Appl. No.: 13/343,032

(22) Filed: Jan. 4, 2012

(65) Prior Publication Data

US 2012/0169854 A1    Jul. 5, 2012

Related U.S. Application Data

(60) Provisional application No. 61/429,641, filed on Jan. 4, 2011.

(30) Foreign Application Priority Data

Jul. 25, 2011 (KR) .......... 10-2011-0073649
Dec. 13, 2011 (KR) .......... 10-2011-0133358

(51) Int. Cl.
*G09G 5/00* (2006.01)
*H04N 13/04* (2006.01)

(52) U.S. Cl.
CPC ........... *G09G 5/003* (2013.01); *H04N 13/0438* (2013.01); *H04N 13/0497* (2013.01); *H04N 2213/008* (2013.01)
USPC .............................................. 348/43; 348/56

(58) Field of Classification Search
USPC .................................................. 348/43, 56
See application file for complete search history.

(56) References Cited

U.S. PATENT DOCUMENTS

| | | | |
|---|---|---|---|
| 5,293,227 A * | 3/1994 | Prince | 348/53 |
| 2001/0021997 A1 | 9/2001 | Lee | |
| 2002/0124243 A1 | 9/2002 | Broeksteeg et al. | |
| 2009/0003307 A1 | 1/2009 | Yang et al. | |
| 2009/0109282 A1* | 4/2009 | Schnebly et al. | 348/55 |
| 2009/0237495 A1 | 9/2009 | Kawahara | |
| 2010/0194857 A1 | 8/2010 | Mentz et al. | |

(Continued)

FOREIGN PATENT DOCUMENTS

| | | | |
|---|---|---|---|
| EP | 2 136 591 A2 | 12/2009 | |
| EP | 2 326 097 A2 | 5/2011 | |

(Continued)

OTHER PUBLICATIONS

International Search Report (PCT/ISA/210), dated Sep. 26, 2012, issued by the International Searching Authority in counterpart International Application No. PCT/KR2011/009997.

(Continued)

*Primary Examiner* — Sath V Perungavoor
*Assistant Examiner* — Jeffery Williams
(74) *Attorney, Agent, or Firm* — Sughrue Mion, PLLC

(57) ABSTRACT

Disclosed are a display apparatus, three-dimensional (3D) glasses and a control method thereof. The method of controlling three-dimensional (3D) glasses for a display apparatus includes: synchronizing clocks for communicating with the 3D glasses; generating drive timing information for driving shutters of the 3D glasses from the synchronized clocks and a frame sync signal of a displayed image; and transmitting a glasses control message, comprising the drive timing information, to the 3D glasses.

61 Claims, 11 Drawing Sheets

(56) References Cited

U.S. PATENT DOCUMENTS

| | | | |
|---|---|---|---|
| 2010/0289883 A1* | 11/2010 | Goris et al. ................... | 348/56 |
| 2010/0295929 A1 | 11/2010 | Yoshifuji et al. | |
| 2011/0025821 A1* | 2/2011 | Curtis et al. ................... | 348/43 |
| 2011/0063103 A1* | 3/2011 | Lee et al. ...................... | 340/505 |
| 2011/0122237 A1 | 5/2011 | Hong | |
| 2011/0143789 A1* | 6/2011 | Watanabe et al. ............. | 455/500 |
| 2011/0205344 A1* | 8/2011 | Lee ............................... | 348/56 |
| 2011/0302619 A1 | 12/2011 | Hale et al. | |

FOREIGN PATENT DOCUMENTS

| | | | |
|---|---|---|---|
| GB | 2 454 493 A | | 5/2009 |
| JP | 2010-062767 A | | 3/2010 |
| KR | 10-2004-0084874 A | | 10/2004 |
| KR | 10-0723267 B1 | | 5/2007 |
| KR | 10-2010-0127179 A | | 12/2010 |
| WO | 02/48859 A2 | | 6/2002 |
| WO | 2008/026133 A2 | | 3/2008 |
| WO | 2009/156902 A1 | | 12/2009 |

OTHER PUBLICATIONS

Notice of Allowance, dated Sep. 10, 2012, issued by the Korean Intellectual Property Office in counterpart Korean Application No. 10-2011-0133358.

Communication dated Feb. 28, 2013 issued by the European Patent Office in counterpart European Patent Application No. 11195058.0.

Communication dated May 11, 2012 from the Korean Patent Office in a counterpart application No. 10-2011-0133358.

Communication from the European Patent Office issued Jun. 22, 2012 in counterpart European Application No. 11182790.3.

Communication, dated Jul. 19, 2013, issued by the United States Patent and Trademark Office, in counterpart U.S. Appl. No. 13/870,078.

Communication dated Apr. 11, 2014 issued by the European Patent Office in counterpart European Application No. 11 195 058.0.

Communication dated Jan. 29, 2014 issued by the United States Patent and Trademark Office in counterpart U.S. Appl. No. 13/870,078.

English translation of communication dated Apr. 28, 2014 issued by the Mexican Institute of Industrial Property in counterpart Mexican Patent Application No. MX/a/2013/07775.

Communication dated May 21, 2014 issued by the United States Patent and Trademark Office in counterpart U.S. Appl. No. 13/227,588.

* cited by examiner

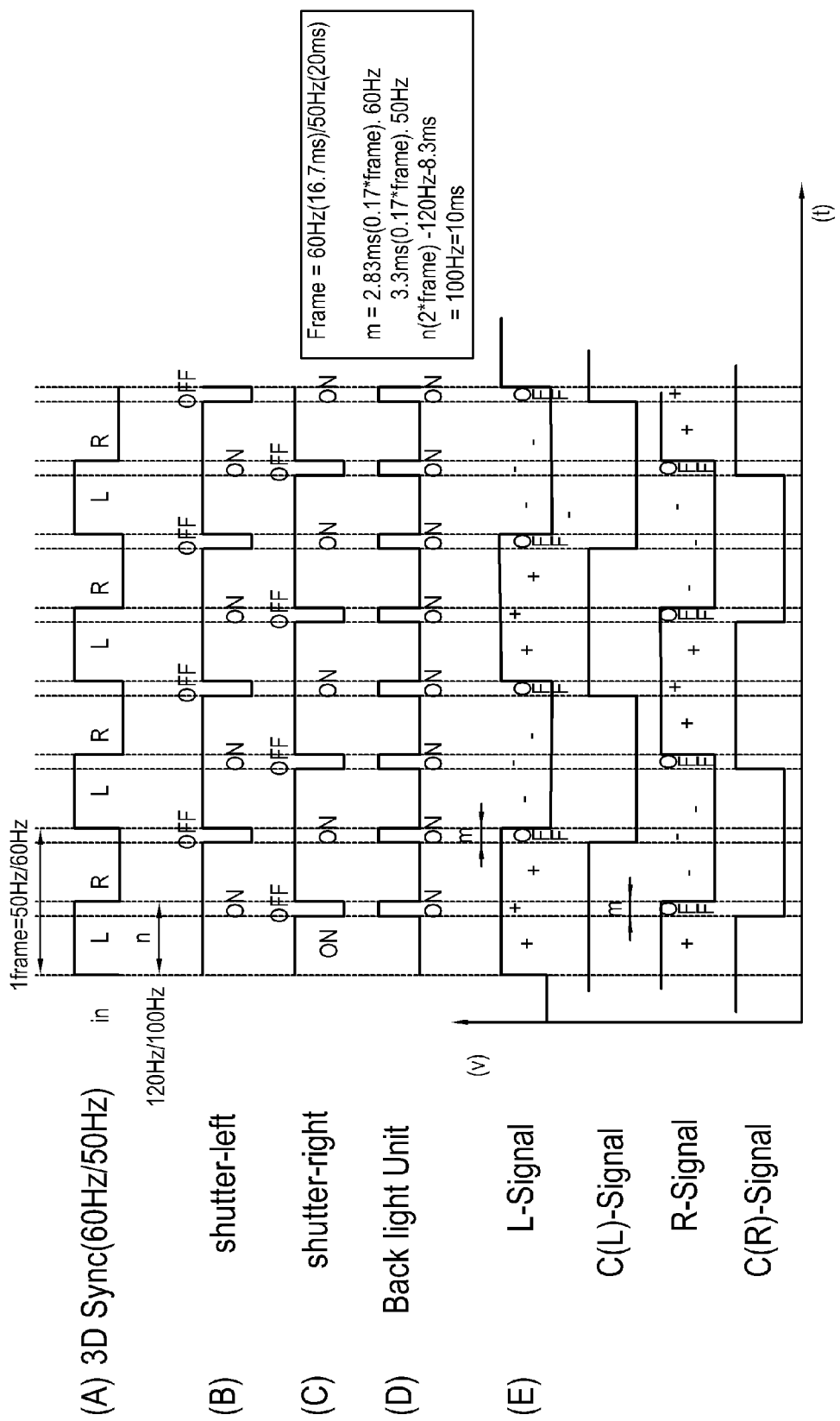

DISPLAY APPARATUS, 3D GLASSES, AND CONTROL METHOD THEREOF

CROSS-REFERENCE TO RELATED APPLICATION

This application claims the benefit of U.S. Provisional Patent Application No. 61/429,641, filed on Jan. 4, 2011 in the United States Patent and Trademark Office, and claims priority from Korean Patent Application No. 10-2011-0073649, filed on Jul. 25, 2011 and Korean Patent Application No. 10-2011-0133358, filed on Dec. 13, 2011 in the Korean Intellectual Property Office, the disclosures of which are incorporated herein by reference.

BACKGROUND

1. Field

Apparatuses and methods consistent with the exemplary embodiments relate to a display apparatus, three-dimensional (3D) glasses and a control method thereof, and more particularly, a display apparatus capable of displaying a 3D image, 3D glasses for viewing the displayed 3D image, and a control method thereof.

2. Description of the Related Art

A display apparatus capable of displaying a 3D image, which allows a user to recognize a 3D effect based on binocular parallax, alternately displays a left-eye image for a user's left eye and a right-eye image for a user's right eye, and involves shutter glasses that operate in accordance with the alternate display. As the display apparatus displays the left-eye image and the right eye image in each frame, the shutter glasses selectively transmit or block images to and from a user's left and right eyes. For instance, the shutter glasses open a shutter corresponding to a user's left-eye when the display apparatus displays the left-eye image, and the shutter glasses open a shutter corresponding to a user's right-eye when the display apparatus displays the right-eye image, thereby allowing a user to recognize a 3D effect of a 3D image.

When such shutter glasses are employed in representing the 3D image, it is important to synchronize the left and right image frames displayed on the display apparatus with operations of the left and right shutters in the shutter glasses. Therefore, the display apparatus may include a control for the shutters of the shutter glasses, or the shutter glasses themselves may include a control for the shutters.

In order to properly establish synchronization, the display apparatus and the shutter glasses are first paired with each other. The display apparatus often serves as a main agent of a pairing process, and is thus burdened with a pairing operation. Therefore, there is a need of solving this problem.

SUMMARY

One or more exemplary embodiments may provide a display apparatus, 3D glasses and a control method thereof, which can perform operation control for shutters of the 3D glasses.

One or more exemplary embodiments may provide a method of pairing a display apparatus with 3D glasses, and the display apparatus and 3D glasses which carry out the same.

According to an aspect of an exemplary embodiment, a method of controlling three-dimensional (3D) glasses for a display apparatus is provided. The method includes: synchronizing clocks for communicating with the 3D glasses; generating drive timing information for driving shutters of the 3D glasses from the synchronized clocks and a frame sync signal of a displayed image; and transmitting a glasses control message, including the drive timing information, to the 3D glasses.

The synchronizing the clocks may further include transmitting a count value of the clocks of the display apparatus to the 3D glasses.

The count value of the clocks may be transmitted using a reconnection train message for paring between the display apparatus and the 3D glasses.

The drive timing information may include a count value of the clocks of the display apparatus corresponding to the frame sync signal.

The glasses control message may further include shutter-operation delay information of the 3D glasses.

The shutter-operation delay information may include delay information regarding a timing between a reference time determined by the drive timing information and a time when a shutter is to be opened or closed.

The glasses control message may further include frame rate information determined in accordance with the frame sync signal.

The glasses control message may be transmitted in a longer cycle than the frame sync signal to prevent the 3D glasses from 3D mode off.

The frame sync signal may include a vertical sync (Vsync) signal of the image.

The method may further include acquiring information about a display unit of the display apparatus; and modifying duty of the drive timing information based on the acquired information about the display unit.

According to an aspect of an exemplary embodiment, a display apparatus is provided including: a display unit; a communication unit which synchronizes clocks for communicating with three-dimensional (3D) glasses; a signal generator which generates drive timing information for driving shutters of the 3D glasses from the synchronized clocks and a frame sync signal of an image displayed on the display unit; and a controller which controls the communication unit to transmit a glasses control message including the drive timing information to the 3D glasses.

The communication unit may transmit a count value of the clocks of the display apparatus to the 3D glasses so as to synchronize the clocks.

The count value may be transmitted using a reconnection train message for paring between the display apparatus and the 3D glasses.

The drive timing information may include a count value of the clocks of the display apparatus corresponding to the frame sync signal.

The glasses control message may further include shutter-operation delay information of the 3D glasses.

The shutter-operation delay information may include delay information regarding a timing between a reference time determined by the drive timing information and a time when a shutter is to be opened or closed.

The glasses control message may further include frame rate information determined in accordance with the frame sync signal.

The glasses control message may be transmitted in a longer cycle than the frame sync signal to prevent the 3D glasses from 3D mode off.

The frame sync signal may include a vertical sync signal (Vsync) of the image.

The controller may acquire information about the display unit, and modify duty of the drive timing information based on the acquired information about the display unit.

According to an aspect of an exemplary embodiment, a method of controlling shutters of three-dimensional (3D) glasses is provided. The method includes: synchronizing clocks for communicating with a display apparatus; receiving a glasses control message, generated using the synchronized clock and a frame sync signal of a displayed image and including drive timing information for driving the shutters of the 3D glasses, from the display apparatus; and controlling the shutters to be opened or closed in sync with the drive timing information.

The synchronizing the clocks may further include receiving a count value of the clocks of the display apparatus from the display apparatus.

The count value may be received using a reconnection train message for paring between the display apparatus and the 3D glasses.

The drive timing information may include a count value of the clocks of the display apparatus corresponding to the frame sync signal.

The glasses control message may further include shutter-operation delay information of the 3D glasses.

The shutter-operation delay information may include delay information regarding a timing between a reference time determined by the drive timing information and a time when a shutter is to be opened or closed.

The glasses control message may further include frame rate information determined in accordance with the frame sync signal.

The receiving the glasses control message may include receiving the glasses control message in a longer cycle than the frame sync signal to prevent the 3D glasses from 3D mode off.

The frame sync signal may include a vertical sync (Vsync) signal of the image.

The method may further include stopping opening or closing the shutters if no glasses control message is received for a preset period of time.

The stopping opening or closing the shutters may include stopping the shutters in an open position.

The controlling the shutters to be opened or closed may include controlling an operation timing and a duty of the shutters based on information about shutter-open delay and information about shutter-close delay.

The controlling the shutters to be opened or closed may include generating a first clock signal having a frequency which is half of a shutter operating frequency; generating a second clock signal having a phase which is different from a phase of the first clock signal by a quarter cycle; and generating a shutter operation driving signal by inverting an XOR value about logic levels of the first and second clock signals.

The controlling the shutters to be opened or closed may include controlling a duty of the shutter operation driving signal by shifting the first clock signal or the second clock signal in accordance with the shutter-operation delay information.

According to an aspect of an exemplary embodiment, three-dimensional (3D) glasses are provided including: a communication unit which communicates with a display apparatus; a shutter unit which includes a left-eye shutter and a right-eye shutter to be alternately opened and closed; and a controller which synchronizes clocks for communicating with the display apparatus, controls the communication unit to receive a glasses control message, generated using the synchronized clocks and a frame sync signal of a displayed image and including drive timing information from driving shutters of the 3D glasses, from the display apparatus, and controls the shutters to be opened or closed in sync with the received drive timing information.

The controller may synchronize the clocks by receiving a count value of the clocks of the display apparatus from the display apparatus.

The count value may be received using a reconnection train message for paring between the display apparatus and the 3D glasses.

The drive timing information may include a count value of the clocks of the display apparatus at a point of time related to the frame sync signal.

The glasses control message may further include shutter-operation delay information of the 3D glasses.

The shutter-operation delay information may include delay information regarding a timing between a reference time determined by the sync signal and a time when a shutter is opened or closed.

The glasses control message may further include frame rate information determined by the frame sync signal.

The glasses control message may be received in a longer cycle than the frame sync signal to prevent the 3D glasses from 3D mode off.

The frame sync signal may include a vertical sync (Vsync) signal of the image.

The controller may control the shutter unit to stop opening or closing the shutters if no glasses control message is received for a preset period of time.

The controller may stop opening or closing the shutters by stopping the shutters in an open position.

The controller may control the shutters to be opened or closed by controlling an operation timing and a duty of the shutters based on information about shutter-open delay and information about shutter-close delay.

The controller may control the shutters to be opened or closed by generating a first clock signal having a frequency which is half of a shutter operating frequency; generating a second clock signal having a phase which is different form a phase of the first clock signal by a quarter cycle; and generating a shutter operation driving signal by inverting an XOR value about logic levels of the first and second clock signals.

The controller may control the shutters to be opened or closed by controlling a duty of the shutter operation driving signal by shifting the first clock signal or the second clock signal in accordance with the shutter-operation delay information.

The controller may control the shutter unit to stop opening or closing the shutters if receiving no glasses control message for a preset time.

The controller may stop opening or closing the shutters by stopping the shutters as being opened.

The controller may control the shutters to be opened or closed by controlling operation timing and duty of the shutters based on information about shutter-open delay and information about shutter-close delay.

The controller may control the shutters to be opened or closed by generating a first clock signal having a half frequency of a shutter operating frequency; generating a second clock signal different in a phase of a quarter cycle from the first clock signal; and generating a shutter operation driving signal by inverting an XOR value about logic levels of the first and second clock signals.

The controller may control the shutters to be opened or closed by controlling the duty of the shutter operation driving signal by shifting the first clock signal or the second clock signal in accordance with the shutter-operation delay information.

According to an aspect of another exemplary embodiment, a pairing method of a display apparatus communicating with 3D glasses is provided. The method includes: receiving a scanning message for pairing; transmitting a response message to the scanning message; receiving an acknowledgement message to the response message; and displaying a popup image of notifying successful pairing with the 3D glasses in response to the acknowledgement message.

The response message may include a threshold received signal strength indication (RSSI) value information corresponding to the 3D glasses.

The threshold RSSI value information may be different in accordance with models of the 3D glasses.

The threshold RSSI value information may be different in accordance with whether the display apparatus is in a home mode or a show room mode.

The popup image may notify pairing with the 3D glasses among the 3D glasses and other devices.

According to an aspect of another exemplary embodiment, a display apparatus is provided including: a communication unit which communicates with 3D glasses; a display unit; and a controller which receives a scanning message for pairing with the 3D glasses, transmits a response message to the scanning message, receives an acknowledgement message to the response message, and displays a popup image of notifying successful pairing with the 3D glasses in response to the acknowledgement message.

The response message may include a threshold received signal strength indication (RSSI) value information corresponding to the 3D glasses.

The threshold RSSI value information may be different in accordance with models of the 3D glasses.

The threshold RSSI value information may be different in accordance with whether the display apparatus is in a home mode or a show room mode.

The popup image may notify pairing with the 3D glasses among the 3D glasses and other devices.

According to an aspect of another exemplary embodiment, a pairing method of 3D glasses communicating with a display apparatus is provided. The method includes: transmitting a scanning message for pairing; receiving a response message to the scanning message from the display apparatus; comparing a received signal strength indication (RSSI) value of the response message with a threshold value; and determining the display apparatus as a pairing object if the RSSI value is equal to or higher than the threshold value.

If a plurality of display apparatuses have the RSSI values higher than the threshold value, the determining the pairing object may include determining the display apparatus having the maximum RSSI value as the pairing object.

The threshold value may be received from the display apparatus.

The method may further include sending the display apparatus an acknowledgement message to the response message.

The method may further include powering off the 3D glasses if receiving no response message to the scanning message from the display apparatus for a predetermined time.

According to an aspect of another exemplary embodiment, 3D) glasses are provided including: a communication unit which communicates with a display apparatus; and a controller which transmits a scanning message for pairing with the display apparatus, controls the communication unit to receive a response message to the scanning message from the display apparatus, compares a received signal strength indication (RSSI) value of the response message with a threshold value, and determines the display apparatus as a pairing object if the RSSI value is equal to or higher than the threshold value.

If a plurality of display apparatuses have the RSSI values higher than the threshold value, the controller may determine the display apparatus having the maximum RSSI value as the pairing object.

The threshold value may be received from the display apparatus.

The controller may control the communication unit to send the display apparatus an acknowledgement message to the response message.

The controller may power off the 3D glasses if receiving no response message to the scanning message from the display apparatus for a predetermined time.

BRIEF DESCRIPTION OF THE DRAWINGS

The above and/or other aspects will become apparent and more readily appreciated from the following description of exemplary embodiments, taken in conjunction with the accompanying drawings, in which:

FIGS. 7A to 7C illustrate duty cycles of 3D glasses of FIG. 5;

DETAILED DESCRIPTION OF EXEMPLARY EMBODIMENTS

Figure 1:
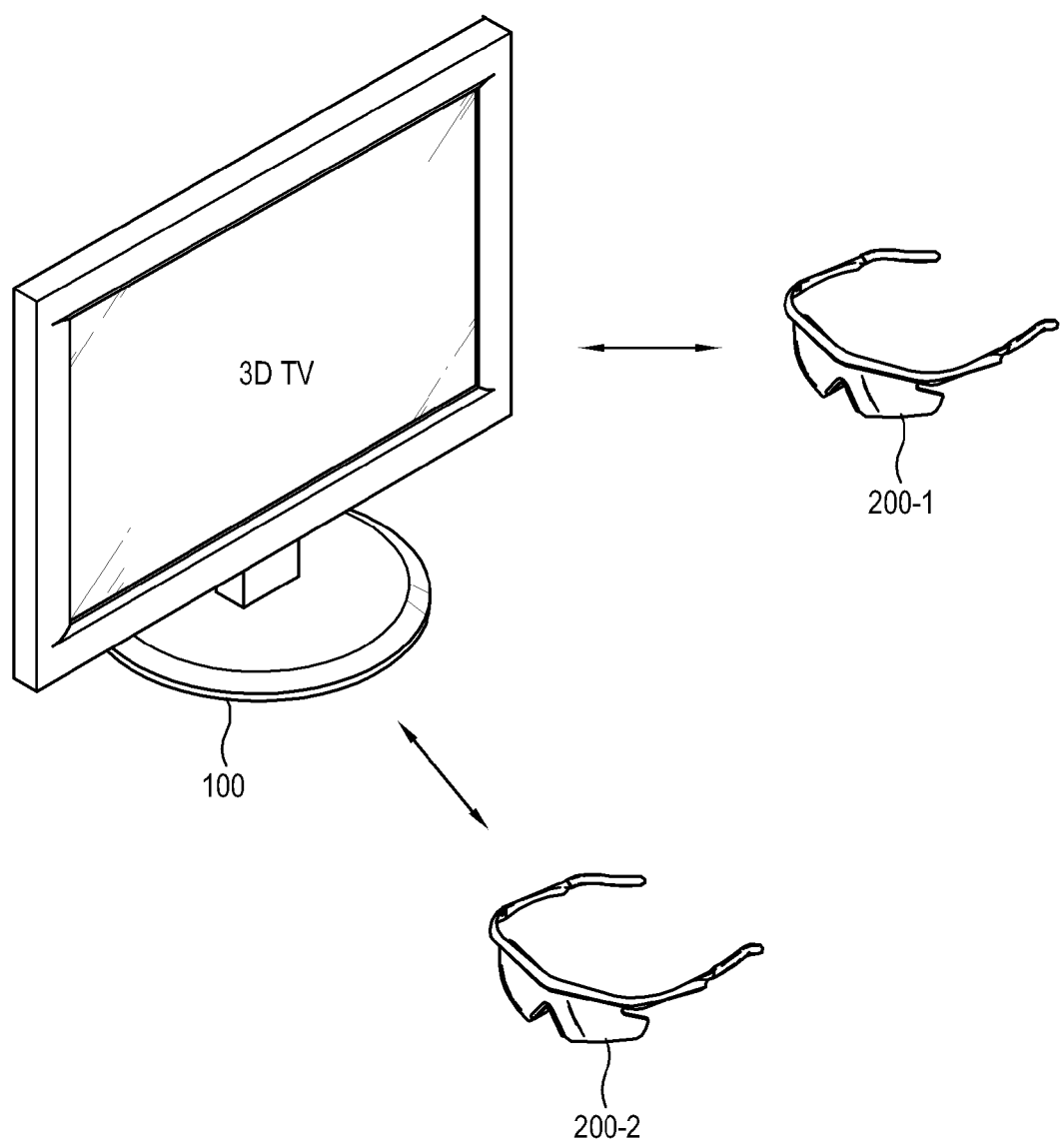
FIG. 1 is a schematic view of a display system including a display apparatus and 3D glasses according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a schematic view of a display system including a display apparatus and 3D glasses according to an exemplary embodiment.

As shown therein, the display system includes a first display apparatus 100 and 3D glasses 200. The 3D glasses may be provided in plural. Thus, the plurality of 3D glasses may operate in association with one display apparatus. In the display system, the first display apparatus 100 may support a remote controller (not shown, for example, a QWERTY remote controller), a headset (not shown, for example, a 2A2DP stream), a cell phone (not shown) containing an application corresponding to a function of a remote controller, a mouse device (not shown, for example, a gestural remote controller), etc. as well as the 3D glasses. The first display apparatus 100 does not have to support keyboards, but may maintain this support option if desired. The display system shown in FIG. 1 corresponds to a home mode of the display apparatus. However, the display system may also be configured to operate in other environments.

In a display apparatus which employs infrared (IR) to communicate with an external device, control data can be transmitted from the display apparatus to the external device, but not from the external device to the display apparatus. Thus, it is impossible for the external device to request a predetermined function or verify the state of the external device.

However, according to the exemplary embodiment as shown in FIG. 1, communication between the first display apparatus 100 and the 3D glasses is achieved by radio frequency (RF) transmissions. The RF communication may correspond to Bluetooth or Zigbee. Through the RF communication, the first display apparatus 100 and the 3D glasses 200 can interactively communicate with each other. Therefore, the 3D glasses 200 can autonomously carry out a pairing process prior to establishing synchronization with the display apparatus or can transmit glasses information to the first display apparatus 100.

Meanwhile, the first display apparatus 100 may support a general pairing process for a display apparatus to then establish synchronization with a television (TV) or headphones, or another external device.

According to the present exemplary embodiment, the first display apparatus 100 may carry out a pairing process with a headset (not shown), a remote controller (not shown), a cell phone (not shown), etc. as well as with the 3D glasses 200. If a plurality of display apparatuses are provided, that is, if the first display apparatus 100 is in a show room mode (not shown), the first display apparatus 100 may also perform a pairing with other display apparatuses.

Figure 2:
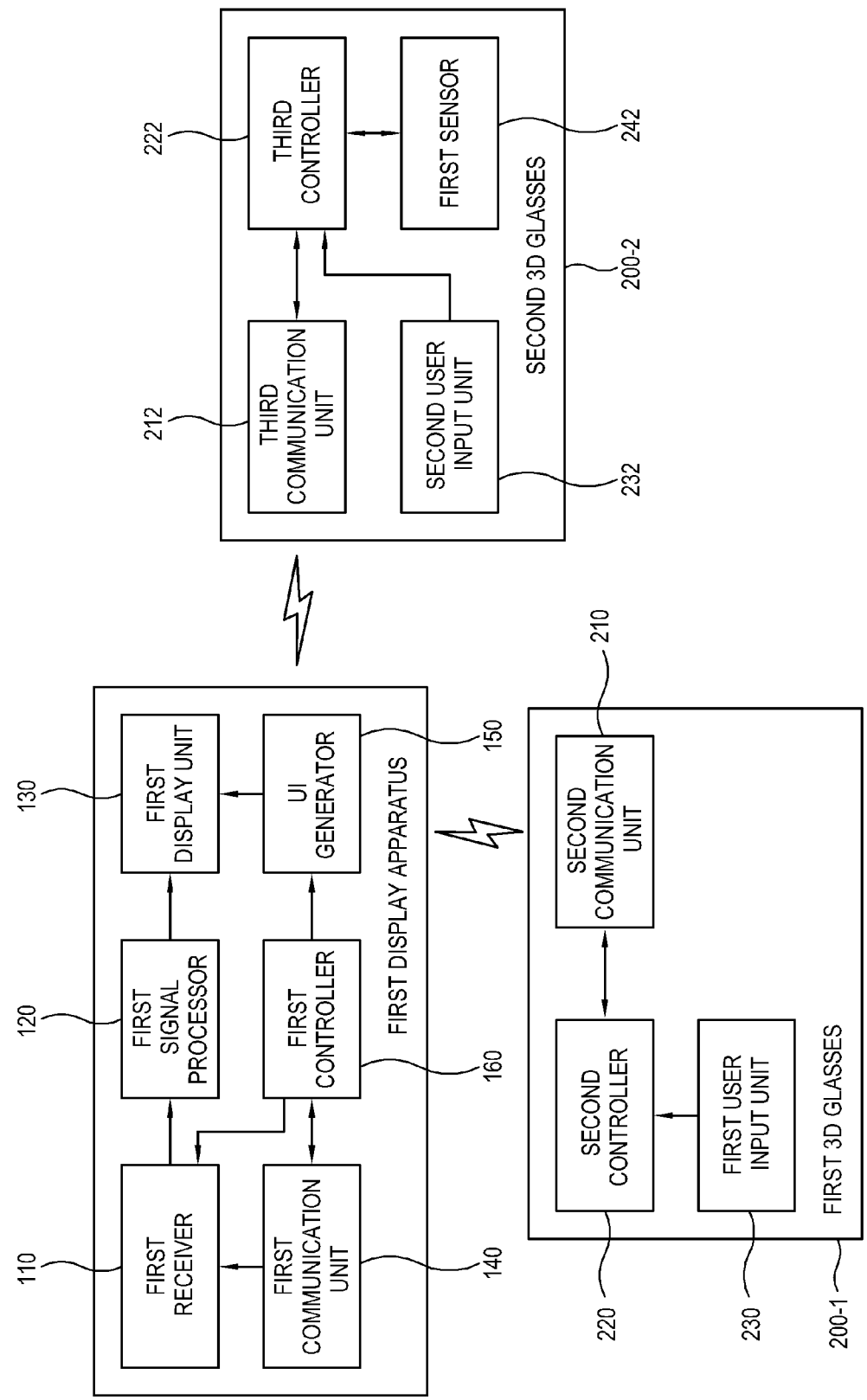
FIG. 2 is a control block diagram of the display apparatus and the 3D glasses according to an exemplary embodiment.
Figure 3:
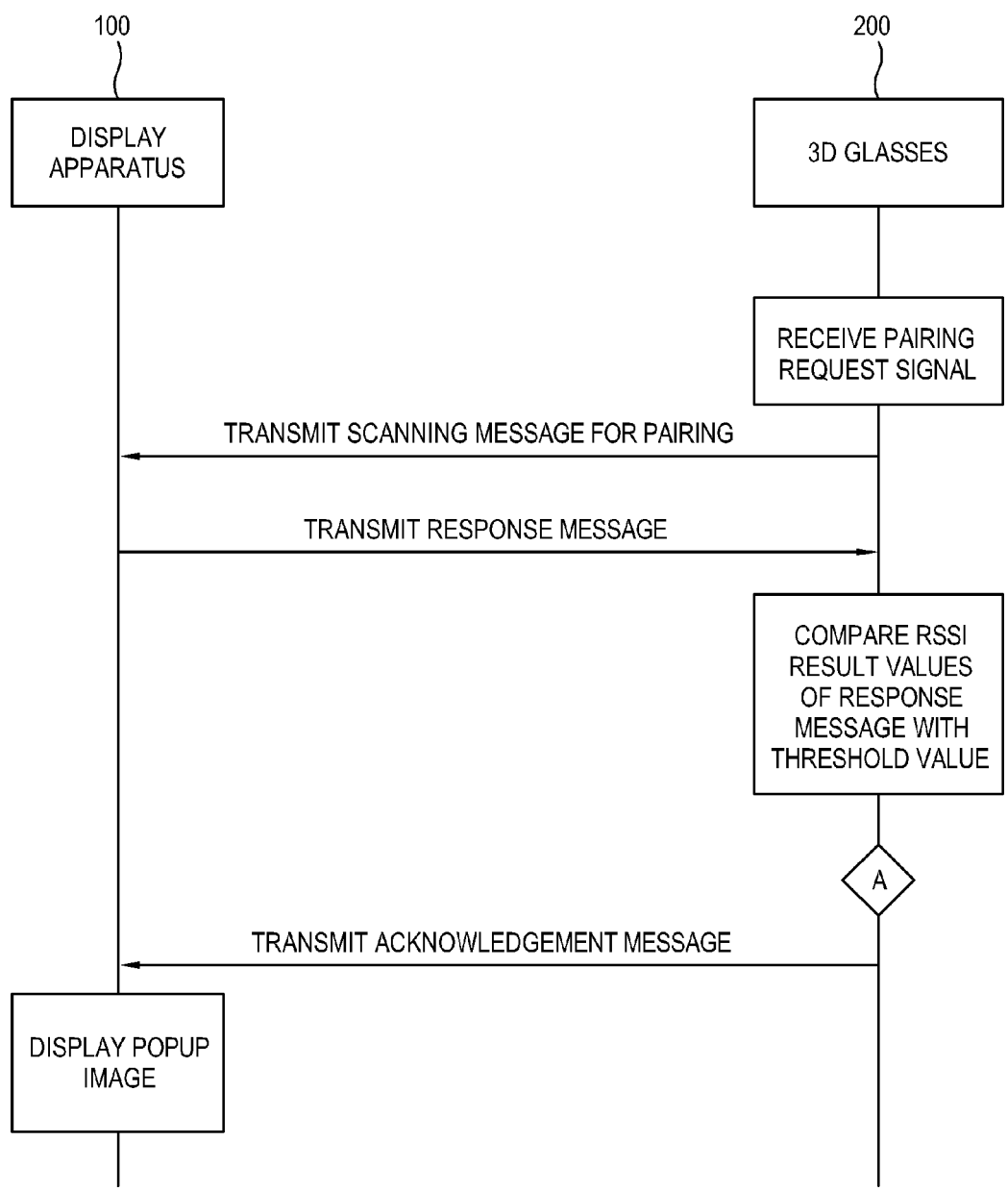
FIG. 3 is a flowchart of pairing the display apparatus and the 3D glasses of FIG. 2.
Figure 4:
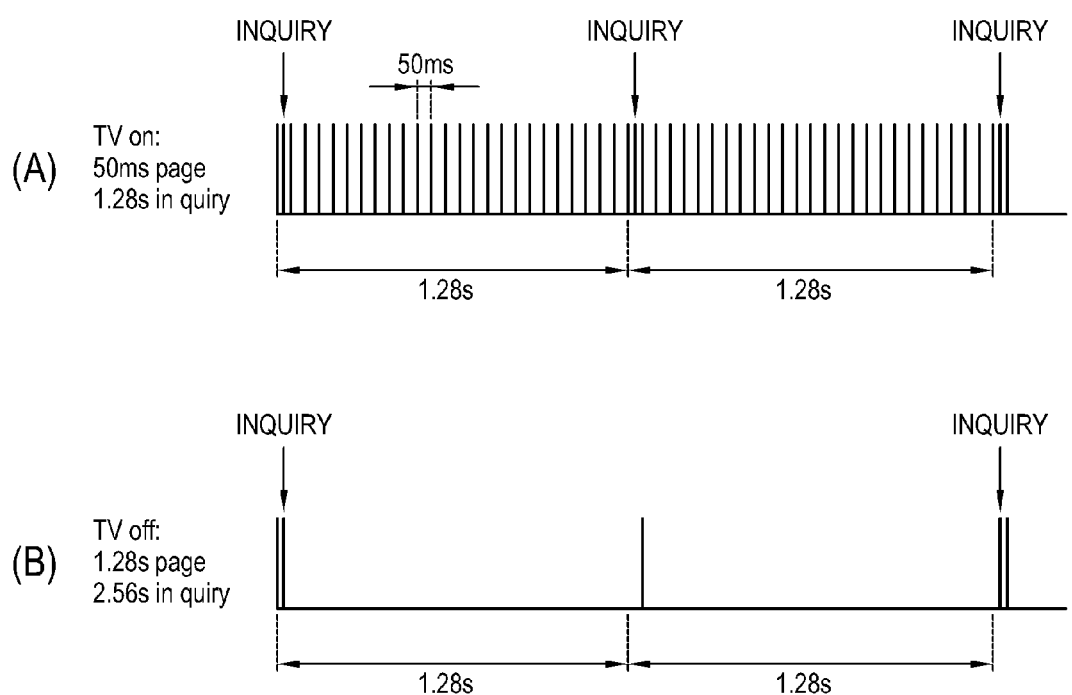
FIG. 4 illustrates a message scan for pairing between the display apparatus and the 3D glasses of FIG. 2.

Below, the first display apparatus 100 and the 3D glasses 200-1 and 200-2 will be described in detail with reference to FIG. 2. FIGS. 2 to 4 are for explaining a pairing process based on interactive communication between the first display apparatus 100 and the 3D glasses 200.

The first display apparatus 100 includes a first receiver 110, a first signal processor 120, a first display unit 130, a first communication unit 140, a user interface (UI) generator 150, and a first controller 160 controlling the other units.

The first display apparatus 100 is a display apparatus capable of displaying both a monocular image (or two-dimensional (2D) image) and a binocular image (or 3D image), and may be a TV, a personal computer (PC), a projector, etc. capable of displaying a 3D image.

The first receiver 110 includes a receiver (not shown) receiving a predetermined video signal from an external video source (not shown). The video source may be an external PC (not shown), a server (not shown) providing a video signal through a network, a transmitter (not shown) of a broadcasting station capable of transmitting a broadcasting signal through airwaves or cables, etc.

The first signal processor 120 processes the received video signal to be displayed on the display unit 130. The video signal may include a 2D image or a 3D image. The video processor (not shown) demodulates the received video signal to be displayed on the display unit 130, and may perform decoding and encoding corresponding to various video formats, de-interlacing, frame refresh rate conversion, scaling, noise reduction for enhancing picture quality, detail enhancement, line scanning, or the like process in addition to the foregoing process. If the received video signal is a 3D video signal and the 3D video signal has various formats, the signal processor 120 may process the 3D video signal corresponding to the various formats to be displayed on the display unit 130. The 3D video signal may have a top-bottom format, a side-by-side format, a horizontal interleave format, a checker board format, a sequential frame format, etc.

If the pairing with the 3D glasses 200 is successfully completed by the first communication unit 140, the first display unit 130 displays a popup image notifying a viewer of the successful pairing. Also, the first display unit 130 basically displays an input video signal processed by the first signal processor 120, and alternately displays a left-eye image and a right-eye image if the video signal is a 3D signal. The first display unit 130 includes a display panel (not shown) displaying an image and a panel driver (not shown). The display panel (not shown) may be a liquid crystal display (LCD) panel having a liquid crystal layer, an organic light emitting diode (OLED) panel having an organic light emitting layer, a plasma display panel (PDP), etc. The first communication unit 140 can communicate with the 3D glasses 200 and may perform RF communication. For example, the first communication unit 140 may include a Bluetooth communication module, a Zigbee communication module, etc. The communication may be based on a Bluetooth communication protocol or a Zigbee communication protocol. Through the first communication unit 140, the first display apparatus 100 may transmit and receive data, a shutter sync signal, a control signal, etc. to and from the 3D glasses 200.

The communication unit 140 receives a scanning message for pairing with the 3D glasses 200, transmits a response message to the scanning, and receives an acknowledgement message to the response message under control of the first controller 160. The pairing process for will be described in detail with reference to FIGS. 3 and 4.

The UI generator 150 generates the popup image providing notification of the successful pairing with the 3D glasses 200 and displays it on the first display unit 130 under control of the first controller 160. The popup image contains information about the pairing. For example, the popup image may provide identification information of the 3D glasses 200 (for example, a media access control (MAC) address or a Bluetooth device (BD) address), and information about whether the pairing is successful. If the first display apparatus 100 pairs with the remote controller (not shown), the headset (not shown), etc. in addition to the 3D glasses, the information about the pairing may further include the types of electronic devices with which the first display apparatus 100 is paired. Through the popup image, a user can be informed which electronic device tries to pair with the first display apparatus 100 and succeeds in the pairing.

The first controller 160 controls the first communication unit 140 to receive a scanning message for the pairing with the 3D glasses 200, transmit a response message to the scanning, and receive an acknowledge message to the response message, and controls the first display unit 130 to display the popup image for providing information of the pairing with the 3D glasses in response to the acknowledge message. The pairing process prior to establishing synchronization will be described in detail with reference to FIGS. 3 and 4.

The first display apparatus 100 may further include a user input unit (not shown). The user input unit (not shown) includes a user interface for receiving a user's input, which may be provided in the form of a button on the first display apparatus 100, provided as a touch panel for a touch screen, or provided in various forms such as a wired or wireless remote controller, a keyboard, etc.

Referring to FIG. 1, the first 3D glasses 200-1 include a second communication unit 210, a second controller 220, and a first user input unit 230. Also, the second 3D glasses 200-2 include a third communication unit 212, a third controller 222, a second user input unit 232, and a first sensor 242. The first 3D glasses 200-1 and the second 3D glasses 200-2 are different in that the second 3D glasses include the first sensor 242. For example, the first 3D glasses 200-1 are general 3D glasses (in box glasses), and the second 3D glasses 200-2 are sensor 3D glasses (sensor glasses).

The second communication unit 210 and the third communication unit 212 communicate with the first display apparatus 100, and may perform RF communication. For example, each of the second communication unit 210 and the third communication unit 212 may include a Bluetooth communication module or a Zigbee communication module, and communicate with the first display apparatus 100 in accordance with a Bluetooth communication protocol or a Zigbee communication protocol. The first 3D glasses 200-1 and the second 3D glasses 200-2 may transmit and receive data, a shutter sync signal, and a control signal, etc. to and from the first display apparatus 100 through the second communication unit 210 and the third communication unit 212, respectively.

The second controller 220 and the third controller 222 respectively control the second communication unit 210 and the third communication unit 212 to transmit the scanning message for pairing with the first display apparatus 100, and receive the response messages to the scanning from the first display apparatus 100. Further, the second controller 220 and the third controller 222 each compare a received signal strength indicator (RSSI) value of the response message with a threshold value, and determine the first display apparatus as an object for pairing if the RSSI value is equal to or higher than the threshold value. The pairing process prior to establishing synchronization will be described in detail with reference to FIGS. 3 and 4.

If the first user input unit 230 and the second user input unit 232 are user interfaces for receiving a user's input, which receive a user's selection related to the function or operation of the 3D glasses 200-1 and 200-2. The first user input unit 230 and the second user input unit 232 may include at least one key button. For example, the first user input unit 230 may be achieved by a power button for turning on/off the first 3D glasses 200-1. The power button signal may be recognized when the button is pressed down, rather than when the button is released. When the power button is pressed down, the 3D glasses are toggled between power on status and power off (sleep mode) status. For example, the second user input unit 232 may be achieved by a pairing button and/or reset button of the second 3D glasses 200-2.

The first user input unit 230 and the second user input unit 232 may receive a user's input for turning on/off the 3D glasses 200-1 and 200-2. For example, in the case of the first 3D glasses 200-2, if the power button provided in the first 3D glasses 200-1 is held down shortly (for example, for less than 3 seconds, for less than 2 seconds, or for less than 1 second), the first 3D glasses 200-1 are powered on. If the power button is held down again shortly (for example, for less than 3 seconds, for less than 2 seconds, or for less than 1 second), while the first 3D glasses 200-1 is powered on, the first 3D glasses 200-1 are powered off. For example, in the case of the second 3D glasses 200-2, the second 3D glasses 200-2 are first taken out from a box and a pairing button provided in the second 3D glasses 200-2 is pressed down (for example, for less than 3 seconds, for less than 2 seconds, or for less than 1 second), the second 3D glasses 200-2 is powered on. After the second 3D glasses 200-2 are first turned on, the second 3D glasses 200-2 may become powered on in accordance with a sense of the first sensor 242 (to be described later). Accordingly, the glasses power may be turned on using the first sensor 242 once the sensor 3D glasses are powered on. If the pairing button is held down again shortly (for example, for less than 3 seconds, for less than 2 seconds, or for less than 1 second) in order to power off the second 3D glasses 200-2, the second 3D glasses 200-2 are powered off.

The first user input unit 230 and the second user input unit 232 may receive a user's input for initiate the pairing for the 3D glasses 200-1 and 200-2 and the first display apparatus. For example, in the case of the first 3D glasses 200-1, if the power button provided in the first 3D glasses 200-1 is held down for a predetermined time (for example, for less than 3 seconds, for less than 2 seconds, or for less than 1 second), even though the first 3D glasses 200-1 are already powered on or in a powered off state, the second controller 220 may determine that proximity pairing with the first display apparatus 100 is requested by a user. For example, in the case of the second 3D glasses 200-2, if the pairing button provided in the second 3D glasses 200-2 is pressed down even though the second 3D glasses 200-2 are already powered on or in a powered off state, the third controller 222 may determine that proximity pairing with the first display apparatus 100 is requested by a user. A signal from the power button may be recognized when the button is pressed down, rather than when the button is released.

The first sensor 242 can sense a predetermined motion or a touch of the second 3D glasses 200-2. For example, the first sensor 242 includes a touch sensor or an accelerometer. The third controller 222 can control the power on/off of the second 3D glasses 200-2 in accordance with sense results of the first sensor 242. After the second 3D glasses 200-2 are first turned on by the pairing button, if the accelerometer senses the motion of the second 3D glasses 200-2 (for example, senses that a user picks up the second 3D glasses 200-2) or the touch sensor senses the touch of the second 3D glasses 200-2 (for example, senses that the second 3D glasses 200-2 are put on a user's face), the third controller 222 can power on the second 3D glasses 200-2. Meanwhile, if the first sensor 242 senses no motion or no touch for a predetermined time (for example, for 5 minutes, for 1 minute, or for 5 seconds) after the power on state, the third controller 222 may power off the second 3D glasses 200-2.

The 3D glasses 200 may further include a battery (not shown) that supplies operation power to the 3D glasses 200. The operation power provided by the battery is under control of the controller 220, 222).

FIG. 3 is a flowchart of pairing the first display apparatus 100 and the 3D glasses 200, and FIG. 4 illustrates a message scan for pairing between the first display apparatus and the 3D glasses 200 of FIG. 2.

In this exemplary embodiment, the first display apparatus 100 and the 3D glasses 200 can support a proximity pairing function using the RSSI.

As shown in the user input units 230 and 232 referring to FIG. 3, a paring request signal is requested from a user through the user input unit 230 or 232 provided in the 3D glasses 200. When the 3D glasses 200 is first taken out of a box (i.e., having an out of box scenario), it is defined that the 3D glasses 200 has no MAC address or no BD address of the display apparatus. If the power button is held down for a predetermined time (e.g., for 3 seconds, or for 2 seconds) even if the general 3D glasses (e.g., the first 3D glasses 200-1) are already powered on or are in a powered off state, or if the pairing button is held down for a predetermined time (e.g., for 2 seconds) even if the sensor 3D glasses (e.g., the second 3D glasses 200-2) are already powered on or are in a powered off state, it is regarded that a pairing request signal is indicated by a user, thereby starting the proximity pairing process. At this time, the predetermined time refers to a time during which the pairing button is pressed down.

The pairing process is tried for a predetermined time (e.g., 5 minutes). If the pairing process is not completed within the predetermined (e.g., 5 minutes), the 3D glasses 200 may be turned off. Also, if a power button of general 3D glasses of a pairing button of sensor 3D glasses is pressed down during the pairing process, the 3D glasses 200 may be turned off.

When receiving the pairing request signal from a user, the controller 220 or 222 of the 3D glasses 200 controls the communication unit 210 or 212 to transmit the scanning message for the pairing. The transmission of the scanning message may be two transmissions of inquiry scan having a period of 1.28 s, and may be two transmissions of inquiry scan having a period of 640 ms. In this exemplary embodiment, the proximity pairing is defined as checking all display apparatuses above a threshold value for two full scan periods.

In response to the transmission of the scanning message for the pairing from the 3D glasses 200, the first display apparatus 100 transmits the response message to the 3D glasses 200.

FIG. 4 shows an inquiry scan of the 3D glasses 200 and a page scan of the first display apparatus 100. (A) of FIG. 4 shows a case in which the first display apparatus 100 is powered on, and (B) shows a case in which the first display apparatus 100 is powered off. In the case of (A) in FIG. 4, the 3D glasses 200 transmit the inquiry scan having a period of 1.28 s to the first display apparatus 100, and the inquiry scan includes a total two of full inquiry scan sections. The first display apparatus 100 continuously performs a page scan having a period of 50 ms. During the total of the two full inquiry scan sections of the 3D glasses 200, if the inquiry scan occurs at the same time as the page scan of the first display apparatus 100, the first display apparatus 100 transmits the response message to the 3D glasses 200 in response to the inquiry scan. In the case of (B) of FIG. 4, the 3D glasses 200 transmit an inquiry scan section having a period of 2.56 s, but the first display apparatus 100 cannot transmit the response message since it is powered off and the page scan is not performed.

The response message may include at least one of identification information of the first display apparatus 100; a threshold RSSI value information corresponding to the 3D glasses 200, through which the 3D glasses can determine a device for concluding the proximity pairing; and an RSSI value information of the response message. Thus, the RSSI value is set up in the first display apparatus 100 and transmitted to the 3D glasses 200.

The threshold of the RSSI value may vary depending on the model of the 3D glasses 200. Accordingly, the RSSI value is transmitted from the first display apparatus 100 to the 3D glasses 200. For example, the general 3D glasses and the sensor glasses may respectively receive response messages from the first display apparatus which include different RSSI values from each other.

Also, the threshold RSSI value information may vary depending on modes of the first display apparatus 100. Therefore, during the proximity pairing process, the first display apparatus 100 communicates to the 3D glasses 200 whether it is in a home mode or a show room mode. For example, the first display apparatus 100 may transmit a different response message containing the threshold RSSI value information depending on whether it is in the home mode (see FIG. 1) or the show room mode (not shown). Here, the home mode or the show room mode of the first display apparatus 100 is selected by a user using the user interface generated by the display apparatus 100.

When the 3D glasses 200 receive a response message, the 3D glasses 200 compare the RSSI value of the response message with the threshold RSSI value. If the RSSI value of the response message is equal to or higher than the threshold RSSI value, the 3D glasses 200 transmit the acknowledge message to the corresponding display apparatus 100.

If the 3D glasses 200 receive two or more response messages (A), the 3D glasses 200 select the display apparatus meeting the response message having the highest RSSI value among the RSSI values of the plural response messages, and then transmit the acknowledge message to the selected display apparatus.

If the 3D glasses 200 receive no response message, the 3D glasses 200 continue the transmission of the scanning message for the pairing for 5 minutes or for another period of time as would be understood by one of skill in the art. If the 3D glasses have still received no response message even after 5 minutes, the 3D glasses 200 determine the proximity pairing to have failed, and thus the controller 220 or 222 of the 3D glasses 200 may power off the 3D glasses 200.

If the 3D glasses 200 successfully pair with the first display apparatus 100, the 3D glasses 200 indicate that the pairing is completed as shown in tables 1 and 2, discussed below, through an LED display unit (not shown).

The acknowledge message transmitted from the 3D glasses 200 to the first display apparatus 100 in response to the response message may contain information about the identification, the state, and the pairing success of the 3D glasses 200.

If the first display apparatus 100 receives the acknowledge message from the 3D glasses 200, it displays a popup screen for informing a user that the pairing is successfully completed. Thus, the popup screen notifies the user that, among a possible plurality of external devices, the 3D glasses are paired with the first display apparatus 100. Also, the popup image may further contain not only the message of notifying of the successful pairing but also a message of identifying the type or types of the paired device (e.g., the 3D glasses, the remote controller, the headset, etc.).

FIGS. 5 to 9 are to explain a shutter operation control of a display apparatus 300 and 3D glasses 400 according to another exemplary embodiment.

Figure 5:
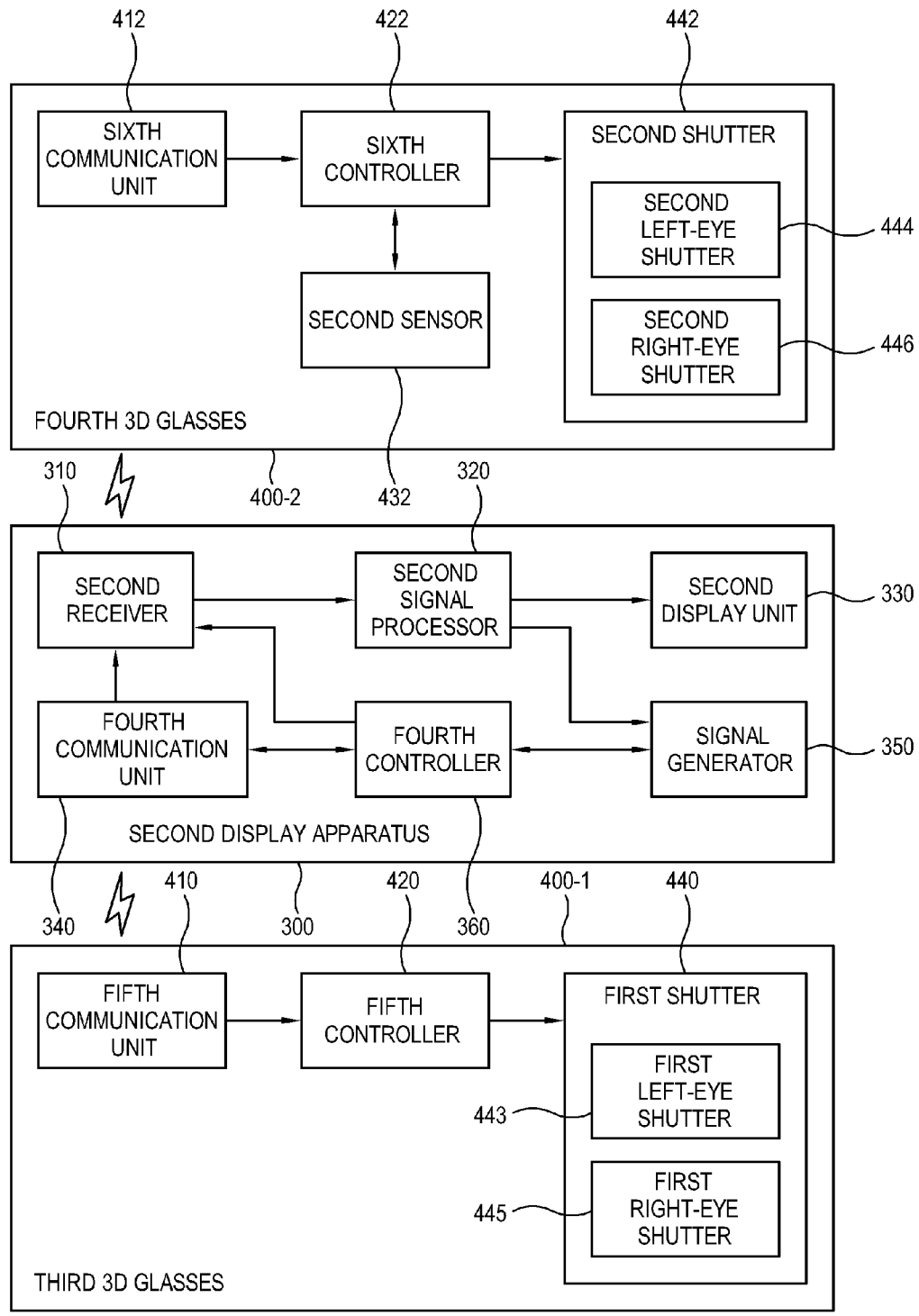
FIG. 5 is a control block diagram of the display apparatus and the 3D glasses of FIG. 2.

FIG. 5 is a control block diagram of a display apparatus 300 and 3D glasses 400.

As shown in FIG. 5, the second display apparatus 300 includes a second receiver 310, a second signal processor 320, a second display unit 330, a fourth communication unit 340 and a fourth controller 360, which are the same as those of the first display apparatus 100 shown in FIG. 2, and thus repetitive descriptions thereof will be avoided as necessary. The second display apparatus 300 also includes a signal generator 350.

Like the first display apparatus 100, the second display apparatus 300 is a display apparatus capable of displaying both a monocular image and a binocular image, and may be a TV, a personal computer (PC), a projector, etc. capable of displaying a 3D image. Further, the second display apparatus 300 includes a receiver (not shown), a video processor (not shown), a display unit (not shown) and a user input unit (not shown), which are the same as/similar to those of the first display apparatus 100 and thus repetitive descriptions thereof will be avoided.

The fourth communication unit 340 communicates with the 3D glasses 400. If the second display apparatus 300 and the 3D glasses 400 start the proximity pairing with each other by the method described with reference to FIGS. 3 and 4, they have information needed for the interactive communication.

Then, the fourth communication unit 340 synchronizes clocks for communicating with the 3D glasses 400 under control of the fourth controller 360 so that the second display apparatus 300 can transmit a control signal to the 3D glasses 400. Like the first communication unit 140 of the first display apparatus 100, the fourth communication unit 340 can do the RF communication. For example, the fourth communication unit 340 may include a Bluetooth communication module, a Zigbee communication module, etc. If there is the Bluetooth communication between the second display apparatus 300 and the third glasses 400, the fourth communication unit 340 performs the communication based on a Bluetooth communication protocol. For the Bluetooth communication with the 3D glasses 400, the fourth communication unit 340 synchronizes Bluetooth clocks under control of the fourth controller 360. Each of the second display apparatus 300 and the 3D glasses 400 includes a local oscillator (not shown) for generating the Bluetooth clocks. Since Bluetooth communication channels are distinguished by the generated Bluetooth clocks, the Bluetooth clocks respectively generated by the second display apparatus 300 and the 3D glasses 400 have to be synchronized for transmitting and receiving data to and from each other. For the synchronization of the Bluetooth clocks, the fourth communication unit 340 transmits a reconnection train message containing a count value of the Bluetooth clock of the second display apparatus 300 to the 3D glasses 400. The 3D glasses 400 receives the reconnection train message for a predetermined period of time and extracts the current count value of the Bluetooth clock of the second display apparatus 300 from the received reconnection train message. The 3D glasses 400 control the local oscillator to generate the Bluetooth clocks in accordance with the current count value of the Bluetooth clock of the second display apparatus 300. For example, the count value of the Bluetooth clock in the 3D glasses is set up in accordance with the current count value of the received Bluetooth clock, so that the Bluetooth clock of the 3D glasses can be synchronized with the Bluetooth clock of the second display apparatus.

Consequently, the Bluetooth clocks of the second display apparatus 300 and 3D glasses 400 are synchronized with each other to transmit and receive data to and from each other.

The signal generator 350 generates drive timing information of the 3D glasses 400 based on the synchronized clocks and a frame sync signal of an image displayed on the second display unit 330 of the second display apparatus 300. The frame sync signal of the image displayed on the second display unit 330 includes a vertical sync signal Vsync of the image of the image, and the vertical sync signal Vsync of the image is transmitted from the second signal processor to the signal generator 350. The signal generator 350 generates the drive timing information from the count value of the clocks of the second display apparatus 300 corresponding to the vertical sync signal Vsync of the image. For example, the drive timing information is a count value of the Bluetooth clocks of the second display apparatus 300 at a point of time related to the vertical sync signal Vsync of the image. The point of time related to the vertical sync signal Vsync of the image may include a rising edge time of the vertical sync signal Vsync or a time after a lapse of a predetermined time from the rising edge time of the vertical sync signal Vsync. The fourth controller 360 controls the fourth communication unit 340 to transmit a glasses control message containing the drive timing information generated by the signal generator 350 to the 3D glasses 400. Thus, the glasses control message may control the timing of opening and closing the left-/right-eye shutters of the 3D glasses 400.

The fourth controller 360 controls the signal generator 350 to generate the glasses control message further containing frame rate information determined by the frame sync signal, and controls the fourth communication unit 340 to transmit the glasses control message to the 3D glasses 400.

In accordance with the frame sync signal or frame rate information contained in the glasses control message, the 3D glasses 400 can control the shutter operation by itself. As described above, the drive timing information may be represented by a system clock (for example, a Bluetooth clock) of a communication system formed between the second display apparatus 300 and the 3D glasses 400. The second display apparatus 300 and the 3D glasses 400 have already known operation timing of a system clock (for example, a Bluetooth clock). Therefore, if the display apparatus 300 transmits certain timing of the system clock as drive timing information, the 3D glasses 400 can know time when the sync signal is generated.

The fourth controller 360 may control the fourth communication unit 340 to transmit the glasses control message to the 3D glasses 400 in a cycle of certain time (for example, an integer multiple of a Vsync period). This is to prevent the 3D glasses 400 from 3D mode off.

The fourth controller 360 may acquire information about the second display unit 330 and control the signal generator 350 to modify the duty of the drive timing information based on the acquired information about the second display unit 330. As described above, the second display unit 330 includes a display panel (not shown) and a panel driver (not shown), and strictly the fourth display unit 360 acquires information about the display panel (not shown). The display panel (not shown) may be achieved by an LCD panel, an OLED panel, a PDP, etc., in which the characteristics of the respective panels are different in light of displaying a video signal according to the kinds of panels. Thus, the fourth controller 360 controls the signal generator 350 to modify the duty of the drive timing information so that the drive timing information can be generated corresponding to the kinds of panels. Therefore, the drive timing information can be generated with different duties according to the characteristics of the display panel of the second display unit 300.

Meanwhile, if the frame sync signal is changed due to channel switching, input source switching, etc. in the 3D mode of the second display apparatus 300, the shutter operation of the 3D glasses has to be synchronized with the changed frame sync signal. For example, the frame sync signal may be changed from one of 50 Hz, 60 Hz and 48 Hz to another one due to the channel switching, the input source switching, etc. If the frame sync signal is changed, the fourth controller 360 generates shutter-operation delay information of the 3D glasses 400 based on the changed frame sync signal so that the glasses control message can contain the shutter-operation delay information. Thus, the glasses control message may contain the shutter-operation delay information and the sync signal timing information based on the changed frame sync signal. Accordingly, the second display apparatus 300 can control the shutter timing delay of the 3D glasses.

Even if the frame sync signal of the second display apparatus 300 and the operation timing (or drive timing) of the left-/right-eye shutter unit are not synchronized with each other, for some unknown reason, the second display apparatus 300 can transmit the glasses control message together with the shutter-operation delay information to the 3D glasses 400.

Figure 6:
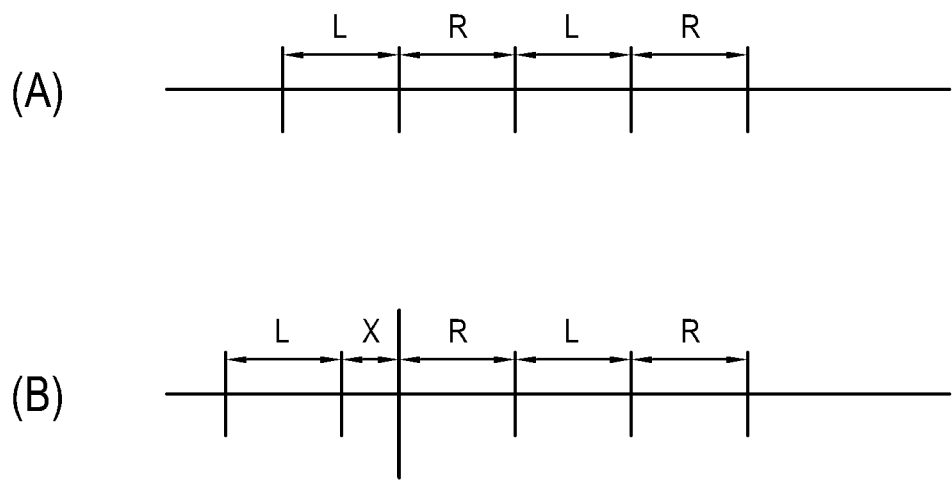
FIG. 6 illustrates shutter-operation delay information of the display apparatus of FIG. 5.

FIG. 6 illustrates an example of the shutter-operation delay information of the second display apparatus 300. Referring to FIG. 6, the shutter-operation delay information is delay information from a reference time determined by the drive timing information to a time of opening or closing the shutter. For example, assume that the sequence of the left-/right-eye images displayed on the display apparatus 300 is not matched with the operations of the left-/right-eye shutters of the 3D glasses 400. (A) of FIG. 6 schematically illustrates timing corresponding to time of outputting the left-/right-eye images in the second display apparatus 300, and (B) of FIG. 6 schematically illustrates timing of opening and closing the left-/right-eye shutters in the 3D glasses 400. The time (A) of outputting the left-/right-eye images in the second display apparatus 300 is different from the time (B) of opening and closing the left-/right-eye shutters in the 3D glasses 400. For example, during a section X of (B) in FIG. 6, the left-eye image is displayed on the second display apparatus 300, but the right-eye shutter is opened and closed the 3D glasses 400, so that they are not matched with each other. At this time, the second display apparatus 300 may transmit on-time delay information (corresponding to the section X) of the left-eye shutter and/or off-time delay information (corresponding to the section X) of the right-eye shutter of the 3D glasses 400 with respect to the reference time determined by the drive timing information of the second display apparatus 300, as the shutter-operation delay information, to the 3D glasses 400. Thus, the time of outputting the left-/right-eye images of the second display apparatus 300 can be synchronized with the time of opening and closing the left-/right-eye shutter of the 3D glasses 400.

In this way, it is possible to control shutter-on/off duty of the 3D glasses 400 based on the shutter-operation delay information contained in the glasses control message.

For example, if the shutter-operation delay information contains open-delay information of the left shutter and close-delay information of the left shutter, the 3D glasses 400 can know a first time when the left shutter is opened, and a second time when the left shutter is closed. Finally, the 3D glasses 400 can know a period (=the second time−the first time) while the shutter is open, and thus calculate duty.

In this exemplary embodiment, the second display apparatus 300 can be paired with a plurality of 3D glasses 400-1 and 400-2, and can transmit the glasses control message to each of the plurality of paired 3D glasses.

According to another exemplary embodiment, the fourth controller 360 of the second display apparatus 300 may control the fourth communication unit 340 to transmit the glasses control message to the 3D glasses 400 periodically in response to the frame sync signal. Thus, the second display apparatus 300 periodically transmits the glasses control message to the 3D glasses 400, and the 3D glasses 400 are woken up sufficiently often to maintain synchronization be synchronized with the frame sync signal or with V sync signal.

Also, the fourth controller 360 of the second display apparatus 300 may control the fourth communication unit 340 to transmit the glasses control message to the 3D glasses 400 in a cycle of time shorter than a preset time in order to prevent the 3D glasses from shutting off the 3D-mode. For example, the fourth controller 360 transmits the glasses control message to the 3D glasses 400 in a cycle of time shorter than the preset time (for example, 3 seconds) so that the 3D glasses 400 can be prevented from turning off the 3D-mode. In other words, the 3D glasses 400 may be automatically powered off if no glasses control message is received for the preset time (for example, 3 seconds).

Referring back to FIG. 5, the 3D glasses 400 may include third 3D glasses 400-1 and fourth 3D glasses 400-2. The third 3D glasses 400-1 are the general 3D glasses like the first 3D glasses 200-1, and the fourth 3D glasses 400-2 are the sensor 3D glasses like the second 3D glasses 200-2. Thus, the third 3D glasses 400-1 and the fourth 3D glasses 400-2 are distinguished by the presence of a second sensor 432. Like the first 3D glasses 200-1 and the second 3D glasses 200-2, each of the third 3D glasses 400-1 and the fourth 3D glasses 400-2 may also include a user input unit (not shown) and a battery (not shown), and the functions thereof are the same as or similar to those described above.

The third 3D glasses 400-1 include a fifth communication unit 410, a fifth controller 420, a first driver 430, and a first shutter 440. The fourth 3D glasses 400-2 include a sixth communication unit 412, a sixth controller 422, a second driver 432, and a second shutter 442.

The fifth communication unit 410 and the sixth communication unit 412 have the same/similar function to the second communication unit 210 and the third communication unit 212. Hence, repetitive descriptions thereof will be avoided. Under control of the fifth controller 420 and the sixth controller 422, the fifth communication unit 410 and the sixth communication unit 412, respectively, can perform the proximity pairing with the second display apparatus 300. The proximity pairing is the same as described above. If the proximity pairing is successful, the 3D glasses 400 and the second display apparatus 300 have information needed for the interactive communication. Then, the second display apparatus 300 synchronizes the clocks for communicating with the 3D glasses 400 so as to transmit a control signal to the 3D glasses 400, which is the same as described for the fourth communication unit 340 of the second display apparatus 300. For example, the 3D glasses 400 receive a reconnection train message containing a count value of the Bluetooth clock of the second display apparatus 300 from the fourth communication unit 340 of the second display apparatus 300 for a predetermined period of time, and extracts the current count value of the Bluetooth clock of the second display apparatus 300 from the received reconnection train message. The 3D glasses 400 set up the local oscillator (not shown) with the current count value of the Bluetooth clock of the second display apparatus 300 so as to generate the Bluetooth clock synchronized with the Bluetooth clock of the second display apparatus 300.

If the second display apparatus 300 leads the clocks to be synchronized for the communication between the second display apparatus 300 and the 3D glasses 400, the second display apparatus 300 transmits the glasses control message containing the drive timing information for driving the shutters to the 3D glasses 400, and also the fifth communication unit 410 and the sixth communication unit 412 receive the glasses control message containing the drive timing information and transmit the message to the controllers 420 and 422.

The fifth controller 420 and the sixth controller 422 receive the glasses control message containing the drive timing information for driving the shutters from the second display apparatus 300 through the respective communication units 410 and 412, and control the respective shutters 440 and 442 to be opened and closed in sync with the timing information of the sync signal contained in the glasses control message. The glasses control message has been described together with the second display apparatus 300, and thus repetitive descriptions thereof will be avoided.

Thus, the fifth controller 420 and the sixth controller 422 control operations of the shutters 440 and 442 in sync with the drive timing information of the sync signal to be opened/closed.

Also, the fifth controller 420 and the sixth controller 422 may receive the glasses control message from the second display apparatus 300, periodically, in response to the frame sync signal.

Further, the fifth controller 420 and the sixth controller 422 may control the shutters 440 and 442 to stop being opened/closed if no glasses control message is received from the second display apparatus 300 for the preset time. For example, the fifth controller 420 and the sixth controller 422 may control the shutters 440 and 442 to stop being opened/closed if no glasses control message is received from the second display apparatus 300 for 3 seconds. In this case, the controllers 420 and 422 control the respective shutters 440 and 442 to remain in the open position. Then, if the 3D glasses 400 are powered on when the power button is pressed down by a user or motion is sensed by the second sensor 432, it is checked whether the 3D glasses 400 are paired with the second display apparatus 300. If the 3D glasses 400 are paired with the second display apparatus 300 and immediately receive the glasses control message from the second display apparatus 300, the shutters 440 and 442 resume being opened/closed. This process may be achieved within a preset time, for example, within 300 ms. Therefore, the 3D glasses 400 can be woken up sufficiently often to maintain synchronization with the frame sync signal contained in the glasses control message received from the second display apparatus 300.

Also, if no glasses control message is received from the second display apparatus 300 within the preset time, the controllers 420 and 422 of the 3D glasses 400 may control the battery (not shown) so that the 3D glasses 400 can be powered off.

If no glasses control message (or a frame sync signal, e.g., Vsync) is received from the second display apparatus 300 for the preset time (e.g., 5 minutes), the general 3D glasses (e.g., the third 3D glasses 400-1) may be powered off.

If the second sensor 432 senses that the sensor 3D glasses (e.g., the fourth 3D glasses 400-2) are put on a user's face, the sensor 3D glasses (e.g., the fourth 3D glasses 400-2) may be powered on to search the second display apparatus 300 even if no glasses control message (e.g., a Bluetooth (BT) signal) is received from the second display apparatus 300 within the preset time.

As described above, the glasses control message received from the second display apparatus 300 may contain the shutter-operation delay information of the 3D glasses 400. Thus, the controllers 420, 422 may control the operation timing and duty of the shutters 440 and 442 based on the shutter-operation delay information (e.g., information about shutter-open delay and information about shutter-close delay), thereby controlling the shutters 440 and 442 to be opened or closed.

The controllers 420 and 442 of the 3D glasses 400 may generate a shutter operation driving signal for the shutters 440 and 442 and thereby control the shutters 440 and 442 to be opened and closed. To this end, the controllers 420 and 422 generate a first clock signal having a frequency which is half of a shutter operating frequency, and a second clock signal, different in a phase by a quarter cycle from the first clock signal, and invert an XOR value about logic levels of the first clock signal and the second clock signal, thereby generating the shutter operation driving signal. Hence, there are a first case in which both the first and second clock signals are either high or low and a second case in which one of the clock signals where is high and the other is low. Accordingly, the shutter is opened in the first case and closed in the second case, or may be closed in the first case and opened in the second case. With this, the controllers 420 and 422 can control the shutters 440 and 442 to be opened and closed.

Also, if the glass control message containing the shutter-operation delay information is received from the second display apparatus 300, the controller 420, 422 shifts the first clock signal or the second clock signal in accordance with the shutter-operation delay information, thereby controlling the duty of the shutter operation driving signal and controlling the shutters to be opened and closed.

According to another exemplary embodiment, the second display apparatus 300 can control any duty cycle of the 3D glasses 400. The duty cycle may change each frame. Supporting faster changes of duty cycle requires faster updates. The duty cycle of the 3D glasses 400 will be described with reference to FIGS. 7A to 7C.

Figure 7A:
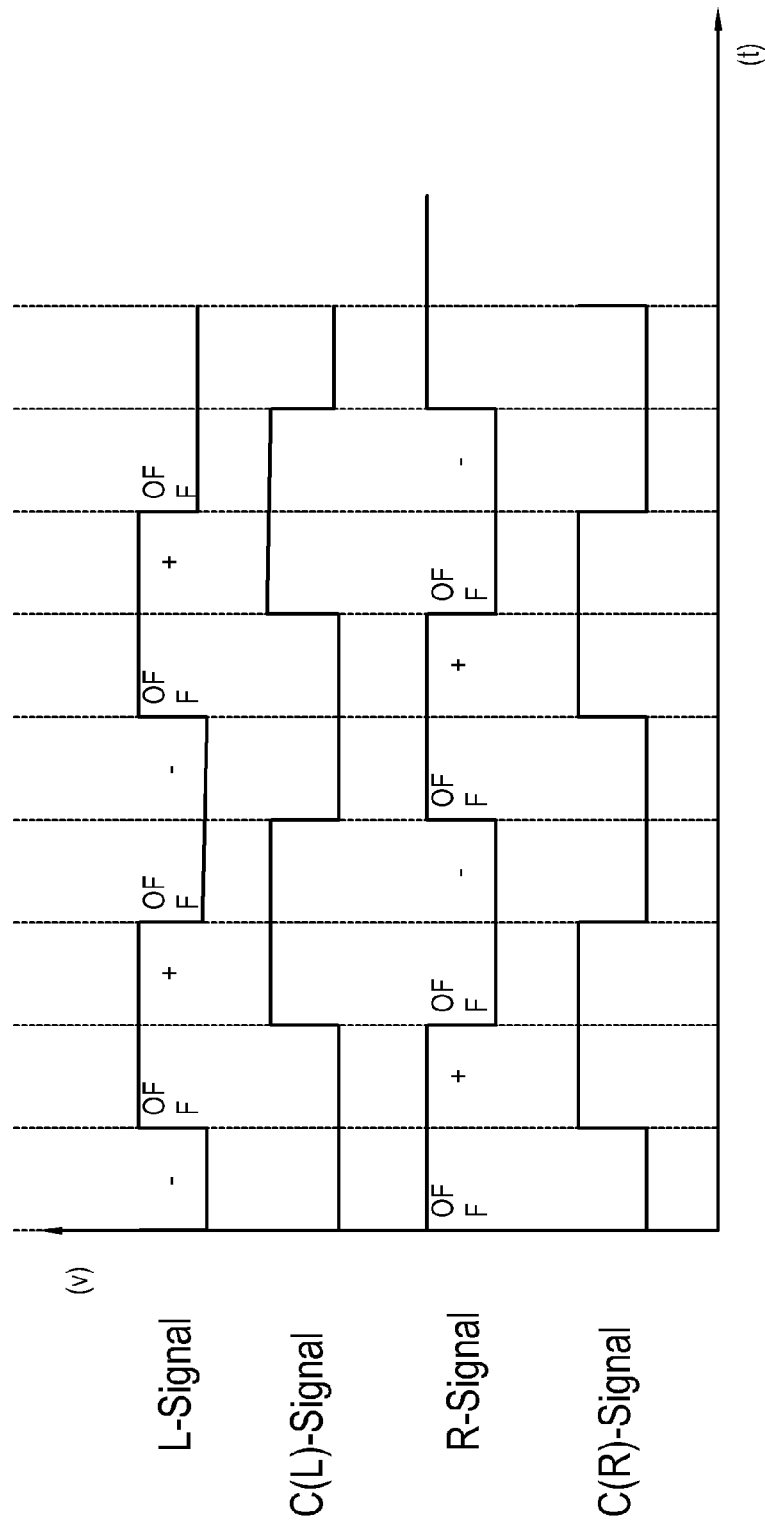

FIGS. 7A and 7C illustrate duty cycles of the 3D glasses 400 under the control of the second display apparatus 300.

FIG. 7A shows a 100% duty cycle of the 3D glasses 400.

In this exemplary embodiment, the 3D glasses 400 use an L-signal and a C(L)-signal; and an R-signal and a C(R)-signal for opening/closing the left-eye shutters 443 and 444 and the right-eye shutters 445 and 446. The C(L)-signal and the C(R)-signal have phase differences of 90 degrees from the L-signal and the R-signal, respectively. When both the L-signal and the C(L)-signal are high or low, the left-eye shutters 443 and 444 are opened. When either of the L-signal or the C(L)-signal is high or low, the left-eye shutters 443 and 444 are closed. The same applies to the right-eye shutters 445 and 446.

Figure 7B:
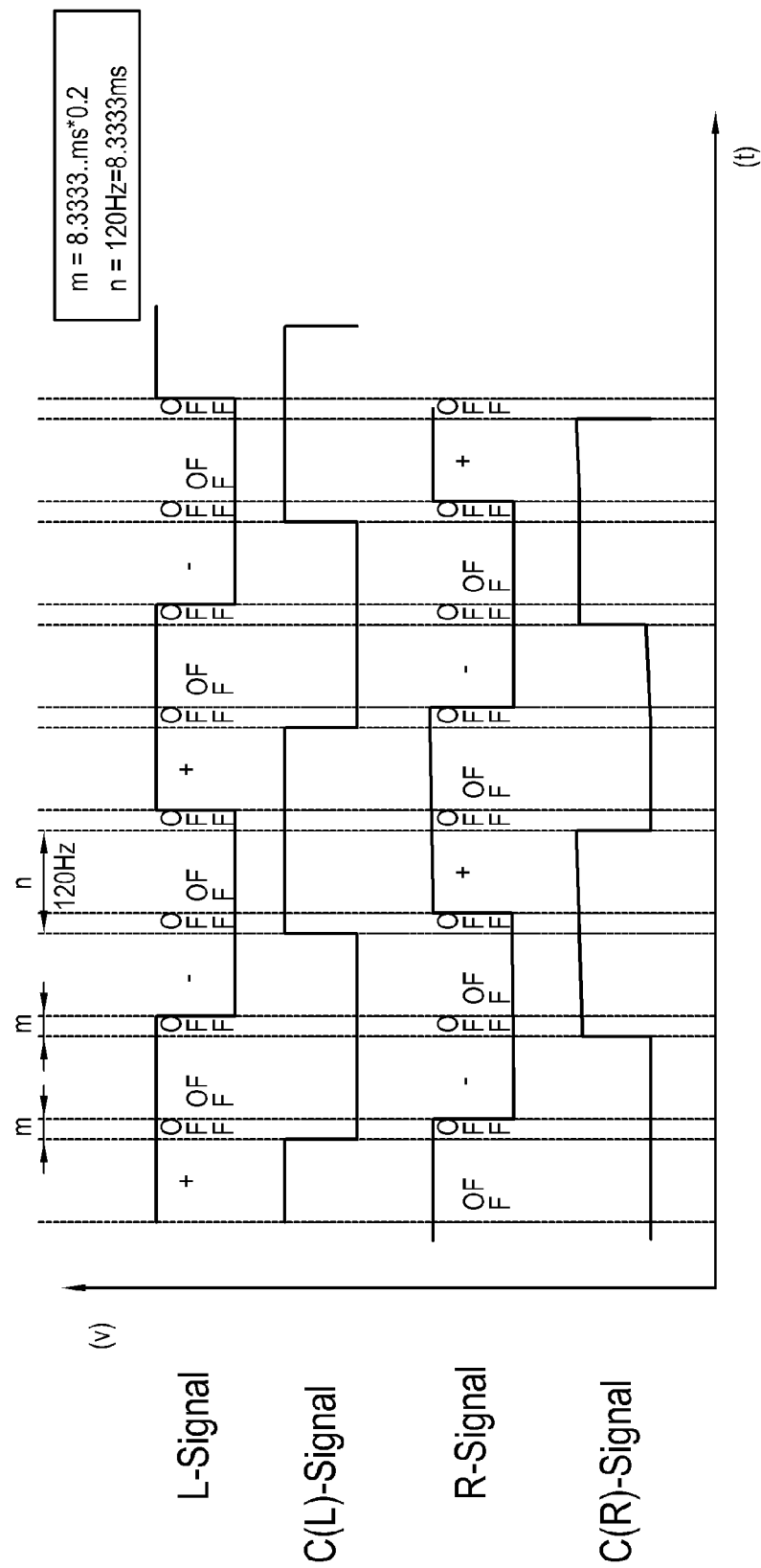

FIG. 7B shows an 80% duty cycle of the 3D glasses 400.

As shown therein, the C(L)-signal and the C(R)-signal have a duty cycle of 80% with respect to the L-signal and the R-signal, respectively. The left-eye shutters 443 and 444 and the right-eye shutters 445 and 446 are opened and closed as described with reference to FIG. 7A. In light of the shutter's operation, the left-eye shutters 443 and 444 and the right-eye shutters 445 and 446 are opened 80% of the time and closed 120% of the time, as compared with opening and closing of the shutters according to FIG. 7A.

FIG. 7C shows a relationship among a 3D sync signal of the second display apparatus 300, a driving signal of the display unit (not shown), and the duty cycle of the 3D glasses 400.

The 3D sync signal of the second display apparatus 300 is shown in the graph (A), and the duty cycle of the 3D glasses 400 is shown in the graph (E). The graph (E) shows the same as described in FIG. 7B. The left-eye shutters 443 and 444 are opened when both the L-signal and the C(L)-signal of the graph (E) are high or low, and closed when either of them is high or low, and thus the shutter's operations are as shown in the graph (B). Also, the right-eye shutters 445 and 446 are opened when both the R-signal and the C(R)-signal of the graph (E) are high or low, and closed when either of them is high or low, and thus the shutter's operations are as shown in the graph (C).

If the display unit (not shown) of the second display apparatus 300 employs a backlight unit (BLU), the backlight unit is driven in a predetermined cycle, i.e., driven when the left-eye shutters 443 and 444 are opened and the right-eye shutters 445 and 446 are closed or when the left-eye shutters 443 and 444 are closed and the right-eye shutters 445 and 446 are opened. In this way, a user alternately views the left-eye image and the right-eye image, and perceives a 3D effect.

Figure 8:
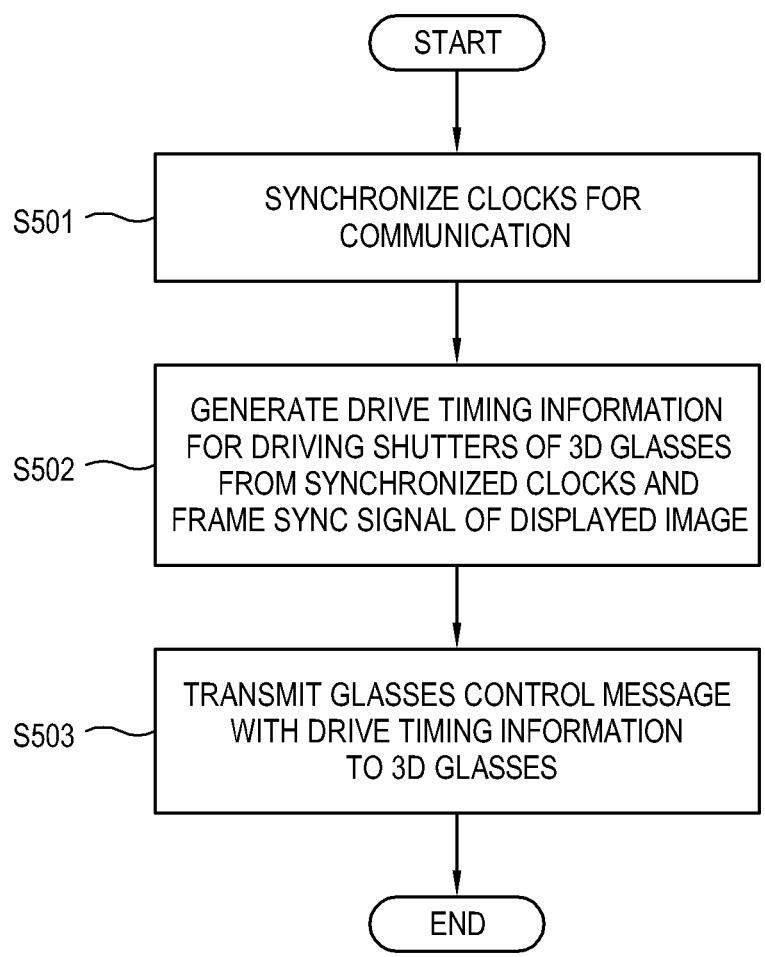
FIG. 8 is a flowchart showing a control operation of the display apparatus of FIG. 5.
Figure 9:
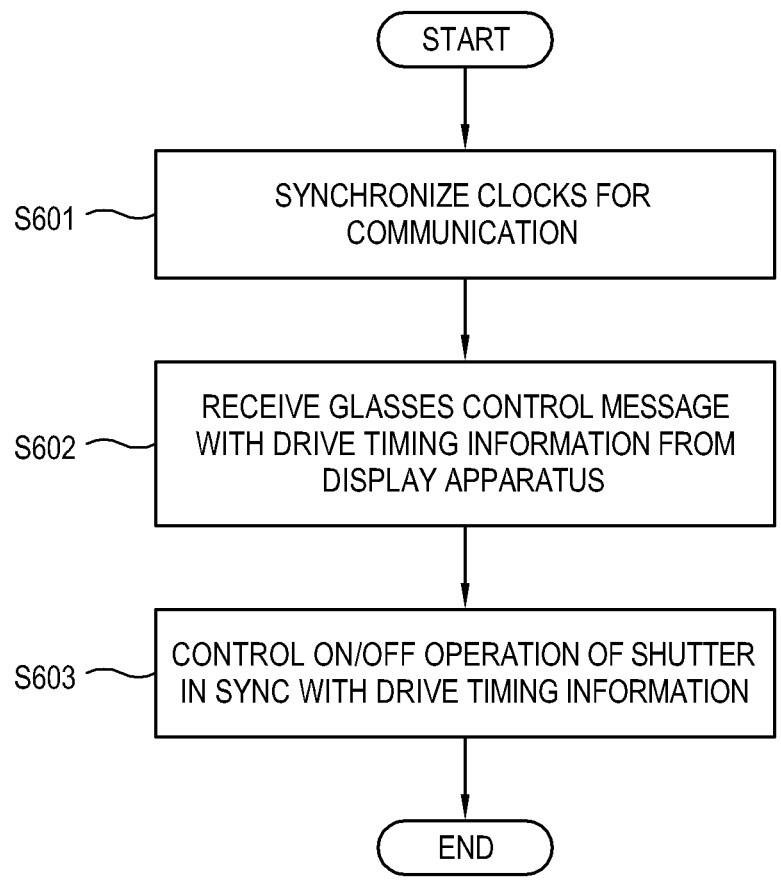
FIG. 9 is a flowchart showing a control operation of the 3D glasses of FIG. 5.

FIG. 8 is a flowchart showing a control operation of the second display apparatus 300, and FIG. 9 is a flowchart showing a control operation of the 3D glasses 400. The control operations of the second display apparatus 300 and the 3D glasses 400 have been described with reference to FIGS. 5 to 7C, and they will be briefly described herein.

Referring to FIG. 8, the second display apparatus 300 performs the proximity pairing with the 3D glasses 400 as described with reference to FIGS. 3 and 4, and then synchronizes the clocks for communicating with the 3D glasses 400 so as to transmit the control message (S501). The signal generator 350 generates the drive timing information for driving the shutters of the 3D glasses from the synchronized clocks and the frame sync signal of the image displayed on the second display unit 330 under control of the fourth controller 360 (S502). Under the control of the fourth controller 360, the fourth communication unit 340 generates the glasses control message containing the drive timing information and transmits it to the 3D glasses 400, thereby controlling the shutter-operation of the 3D glasses (S503).

Referring to FIG. 9, after the proximity pairing between the second display apparatus 300 and the 3D glasses 400 is performed as described with reference to FIGS. 3 and 4, the 3D glasses 400 synchronizes the clocks for communicating with the second display apparatus 300 (S601). After the synchronization of the clocks, if the glasses control message containing the drive timing information for driving the shutters of the 3D glasses 400 is received from the second display apparatus 300 (S602), the 3D glasses 400 controls the shutters' on/off operations in sync with the received drive timing information.

According to another exemplary embodiment, the display apparatus 100, 300 may further include a storage unit (not shown). The storage unit (not shown) is a storage medium where various programs or the like needed for operating the display apparatus 100, 300, which can be achieved by a memory, a hard disk drive (HDD), etc. For example, the storage unit (not shown) may include a read only memory (ROM) for storing a program to implement operations of the controllers 140, 330, a random access memory (RAM) for temporarily storing data resulting from the performed operation, etc. Also, the display apparatus 100, 300 may further include an electrically erasable and programmable ROM (EREPROM) or the like for storing a variety of reference information. Further, if the communication unit 110, 310 is a Bluetooth module, a flash memory may further be provided for supporting the communication unit 110, 310. The flash memory (e.g., SST and Eon) may support the Bluetooth module (e.g., 2046). If both SST and Eon are provided as the flash memories, two mini drivers are made available for driving the two memories, but two different config files are not be required. The Bluetooth module (e.g., 2046) has to be able to switch between class 2 and class 1.5 under VSC. This is likely to be class 2 for the home mode and class 1.5 for the show room mode. The Bluetooth module (e.g., 2046) is an upgradeable via a system tool of the display apparatus 100, 300 using input from a USB port (not shown) on the display apparatus 100, 300. The display apparatus 100, 300 may transmit a frame sync signal (e.g., Vsync) information frequently enough to maintain the frame sync signal (e.g., Vsync) output from a slave display apparatus within a jitter requirements of the display apparatus 100, 300.

According to another exemplary embodiment, the 3D glasses 200 and 400 may further include light emitting diode (LED) indicators (not shown). Thus, the statuses of the 3D glasses 200 and 400 may be displayed through the LED indicators. The statuses of the 3D glasses include power on; power off, auto off, battery (low, charging and charging full); and pairing (pairing mode and pairing complete). The LED indication may be the same or different in accordance with whether the 3D glasses are the general 3D glasses (e.g., the first 3D glasses 200-1 and the third 3D glasses 400-1) or the sensor 3D glasses (e.g., the second 3D glasses 200-2 and the fourth 3D glasses 400-2). With reference to the following Tables 1 and 2, the BT signal is the glasses control message received from the display apparatus 100, 300.

TABLE 1

General 3D glasses

| Status | Button operation | 2 Color LED operation |
|---|---|---|
| Power on | Short Press | Green LED on 3 s |
| Power off | Short Press(<3 sec.) | Red LED on 3 s |
| Auto off | No BT signal for 3 sec. | (No LED indication) |
| Low Battery | Powered on | Red LED on/off every 2 s (On 0.3 sec, Off 1.7 sec) |
| Pairing mode | | Green LED on/off (Green on 200 ms→off 200 ms→Red on 200 ms→off 200 ms). The blinking time should be over 3 sec. although the pairing completed before 3 sec. |
| Pairing complete | | LED off |

TABLE 2

Sensor 3D glasses

| Status | Button operation | 2 Color LED operation |
|---|---|---|
| Power on | Short Press | Green LED on 3 s |
| Power off | Short Press(<3 s) | Red LED on 3 s |
| Auto off | No BT signal for 3 sec | (No indication) |
| Low Battery | Powered on | Red LED on/off every 2 s (On 0.3 sec, Off 1.7 sec) |
| Charging | | Orange Led on (Red& Green LED flash: on 5 ms, off 5 ms) |
| Charging full | | LED off |
| Pairing mode | | Green LED on/off (Green on 200 ms→off 200 ms→Red on 200 ms→off 200 ms). The blinking time should be over 3 sec. although the pairing completed before 3 sec. |
| Paring complete | | LED off |

According to another exemplary embodiment, the 3D glasses 200, 400 may further have a function of a low battery mode. The 3D glasses 200, 400 may further include a battery (not shown) for supplying operating power to the elements included therein.

As shown in the Tables 1 and 2, as the 3D glasses 200 and 400 are drained, the red LED between the LED indicators (not shown) provided in the 3D glasses 200 and 400 start to blink every 2 seconds (LED on 0.3 s, LED off 1.7 s).

In the case of the general 3D glasses (e.g., the first 3D glasses 200-1 and the third 3D glasses 400-1), if a battery level is getting lower than 2.5 V, the 3D glasses 200-1, 400-1 indicate the low battery mode. When the battery is replaced with a new one, the low battery mode is released.

In the case of the sensor 3D glasses (e.g., the second 3D glasses 200-2 and the fourth 3D glasses 400-2), if a battery level is getting lower than 3.5 V, the 3D glasses 200-2 and 400-2 indicate the low battery mode. When the 3D glasses 200-2 and 400-2 are connected to a USB port using a micro USB cable, the 3D glasses 200-2 and 400-2 start to recharge and the low battery mode is released.

According to another exemplary embodiment, the 3D glasses 200, 400 may further have a function of a factory reset mode. The factory reset mode of the 3D glasses 200, 400 is defined as erasing identification information of the display apparatus (e.g., the BD address of the display apparatus) and powering off without a pairing process. After the 3D glasses

200, 400 are manufactured, they undergo testing pairing with a display apparatus in order to test the performance or defectiveness of the 3D glasses 200, 400. The identification information of the testing display apparatus is stored in the 3D glasses 200, 400 during this pairing process, but is undesirable after the 3D glasses 200, 400 are released as a product. Therefore, to erase the identification information of the testing display apparatus, there is provided the function of the factory reset mode. The green LED and then the red LED of the LED indicator (not shown) will be illuminated (one second each) when the 3D glasses 200, 400 enter the factory reset mode and the factory reset mode has completed successfully.

In the case of the general 3D glasses (e.g., the first 3D glasses 200-1 and the third 3D glasses 400-1), the factory reset mode is entered by holding down a power button and inserting the battery. The power button remains pressed while hardware (h/w) reset boot up is completing. As part of the boot up, firmware (f/w) checks to see if the power button is depressed. If the power button is depressed, the 3D glasses will enter the factory reset mode. If after the boot up, the f/w checks the power button and the power button is not depressed, then the 3D glasses will not enter the factory reset mode.

In the case of the sensor 3D glasses (e.g., the second 3D glasses 200-2 and the fourth 3D glasses 400-2), the factory reset mode is entered by holding down a pairing button and also depressing a reset button. The pairing button remains pressed while the hardware (h/w) reset boot up is completing. As part of the boot up, the firmware (f/w) checks to see if the pairing button is depressed. If the pairing button is depressed, the 3D glasses will enter the factory reset mode. If after boot up, the f/w checks the pairing button and the pairing button is not depressed, then the 3D glasses will not enter the factory reset mode.

In the case of the sensor 3D glasses, an additional operation is taken to power down the sensor 242, 432 when the factory reset mode is executed.

According to another exemplary embodiment, the 3D glasses 200, 400 may automatically detect a signal frequency received from the display apparatus 100, 300.

When the 3D glasses 200, 400 are in general operation, and the frame sync signal received from the display apparatus 100, 300 (e.g., the frequency of a Vsync signal as a frame sync signal) is changed from either of 50 hz, 60 hz and 48 hz to another, the 3D glasses 200, 400 will detect the signal source automatically and work at the new signal frequency.

If a channel or a video source of a broadcasting signal displayed on the display apparatus 100, 300 is changed, the frame sync signal may be changed, and the 3D glasses 200, 400 may automatically detect the signal source corresponding to the changed frame sync information and work at the new signal frequency.

According to another exemplary embodiment, the display apparatus 100, 200 may synchronize with another display apparatus. For example, the display apparatus 100, 200 may coexist with at least one additional display apparatus in a show room. At this time, a user may set up the display apparatus 100, 200 to enter the show room mode through a user input unit. When a plurality of display apparatuses are placed in a show room, it is desirable for a user to be able to perceive 3D images displayed by the plurality of display apparatuses through a single pair of 3D glasses. Although the plurality of display apparatuses display 3D images different from one another, the left-eye image and the right-eye images are therefore displayed in at least the same sequence, corresponding to the operations of the left-eye shutter and the right-eye shutter of the one pair of 3D glasses. Therefore, the plurality of display apparatuses placed in the show room are synchronized with one another.

If the display apparatus 100, 300 is in the show room mode, a master mode or a slave mode may be further set up through a user input unit. Putting the display apparatus 100, 300 in the master mode will initiate an inquiry scan to find any other master display apparatus. Putting the display apparatus 100, 300 in the slave mode will start the pairing process with a master display apparatus.

The application of the display apparatus may set the identification information (e.g., BD address) of the master display apparatus to a user selectable value (e.g., a predefined one of ten values). The inquiry scan performed when the master mode is selected on the display apparatus may determine if there are other master display apparatuses and which of the ten predefined values are being used (those in use will be pulled out of a draw down menu a user can select). The goal of this function is that if a master display apparatus breaks or is sold, a new display apparatus can be put into its spot in the show room and all of the slave display apparatuses, 3D glasses, headsets and remote controllers can be used without having to reconfigure all of these devices.

The slave display apparatus can communicate to the master display apparatus to receive the frame sync signal (e.g., a vsync signal). The Bluetooth device internally provided in the slave display apparatus may control the delay of the frame sync signal (e.g., a vsync signal) to a central processing unit (CPU) of another the other display apparatuses. The frame sync signal (e.g., a vsync signal) of the slave display apparatus has to be generated without missing a clock signal. The minimum control delay step is under 10 μsec. The display apparatus may control the delay time up to 20 msec. The A2DP headphones and the remote controller are supported by the slave display apparatus.

According to another exemplary embodiment, the display apparatus 100, 300 and the 3D glasses 200, 400 have a jitter allowance for transmitting a signal.

A shuttering jitter of the 3D glasses 200, 400 is less than ±50 μsec.

The shuttering jitter of the frame sync signal (e.g., a Vsync signal) of the slave display apparatus is less than ±8 μsec, and may be improved to ±5 μsec.

According to another exemplary embodiment, the display apparatus 100, 300 may support 'host assisted collaboration' adaptive frequency hopping (AFH) function. The display apparatus 100, 300 may control a mask band width of 'host assisted collaboration' AFH.

If the communication unit 110, 310 of the display apparatus 100, 300 includes a Bluetooth communication module, the mask band width of 'host assisted collaboration' AFH is controlled to use a bandwidth different from the bandwidth for Wi-Fi, thereby coexisting with Wi-Fi.

According to another exemplary embodiment, the display apparatus 100, 300 supports a headless mode for a cell phone.

The headless mode is defined as a power down state of the display apparatus where the Bluetooth device internally provided in the display apparatus runs a small stack sufficient to recognize a power on button (some remote keys may be added for power on in the future) from a remote controller. When the Bluetooth device recognizes a power on button press from the remote controller, the Bluetooth device may transmit a hardware interrupt signal to the display apparatus to wake it up from a standby mode. It is recognized that the Bluetooth device may consume higher power than an IR receiver due to the need to be in the scan mode looking for the power on button press.

A target remote controller supporting the headless mode may be a smart phone which has a remote control application downloaded thereto. The smart phone may perform standard pairing from an already powered up display apparatus running the full Bluetooth stack.

The general remote controller (e.g., an in-box remote controller) may continue to use infrared for power on. However, the general remote controller may alternately transmit a Bluetooth signal for the power on.

All Bluetooth remote controllers (e.g., an Bluetooth in-box remote controller) require the foregoing proximity pairing in order to power on the display apparatus the first time.

According to another exemplary embodiment, specifications of a Tx module connector in the display apparatus 100, 300 (e.g., a TV (see a table 3) and a monitor (see a table 4)) are as follows.

TABLE 3

TV

| | Pin Name | I/O | Pin description |
|---|---|---|---|
| 1 | Power_DET(STBY) | I | Power_DET(STBY) is internally pull-up<br>TV standby mode: Low<br>TV power on mode: High |
| 2 | TV Wake up | O | Standby mode: Floating (TV system have a pull-up resistor)<br>Power On time: Low for 300 msec then floating again |
| 3 | A5V | I | BT module Power supply is DC 5 V<br>A 5V is supplied even if TV is turn off (standby mode) |
| 4 | USB D− (BT) | I/O | USB Data in/out |
| 5 | USB D+ (BT) | I/O | USB Data in/out |
| 6 | GND | — | |
| 7 | 3D Sync Out | I | 3D sync input from TV |
| 8 | 3D Sync In | O | 3D TV to TV frame sync output to TV |

TABLE 4

Monitor

| Pin Name | I/O | Pin description | Level |
|---|---|---|---|
| 3D Enable | I | 3D Enable is internally pull-up<br>2D mode: Low<br>3D mode: High | 3.3 V |
| Pairing Message | O | Normal Status: Floating (Monitor system have a pull-up resistor (3.3 k)<br>Pairing Success: Low for 300 msec then floating again | 3.3 V |
| B5V | I | BT module Power supply<br>B5v must be controlled by MCU for BT module reset | 5 V |
| USB D− (BT) | I/O | USB Data in/out | |
| USB D+(BT) | I/O | USB Data in/out | |
| GND | — | | |
| 3D Sync Out | I | 3D sync input from Monitor | 3.3 V |
| NC | O | Reserved | |

As described above, there are provided a display apparatus, 3D glasses and a control method thereof, which can perform operation control for shutters of the 3D glasses.

Also, there are provided a method of pairing a display apparatus with 3D glasses, and the display apparatus and 3D glasses which carry out the same.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A method of controlling a display apparatus, the method comprising:
    receiving, from active glasses, a scanning message for pairing with the active glasses;
    transmitting, to the active glasses, a response message for pairing, the response message comprising identification information of the display apparatus;
    in response to the transmitting the response message, receiving from the active glasses an acknowledge message for pairing, the acknowledge message comprising information about identification of the active glasses;
    synchronizing clocks for communicating with the active glasses;
    generating drive timing information for driving shutters of the active glasses from the synchronized clocks; and
    transmitting a glasses control message, comprising the drive timing information, to the active glasses.

2. The method according to claim 1, wherein the synchronizing the clocks further comprises transmitting a count value of Bluetooth clocks of the display apparatus to the active glasses.

3. A method of controlling a display apparatus, the method comprising:
    receiving, from active glasses, a scanning message for pairing with the active glasses;
    transmitting, to the active glasses, a response message for pairing, the response message comprising identification information of the display apparatus; and
    in response to the transmitting the response message, receiving from the active glasses an acknowledge message for pairing, the acknowledge message comprising information about identification of the active glasses
    wherein the response message from the display apparatus further comprises threshold received signal strength indication (RSSI) value information, and
    wherein the clocks are Bluetooth clocks, and the count value of the Bluetooth clocks is transmitted using a reconnection train message for paring between the display apparatus and the active glasses.

4. The method according to claim 1,
    wherein the generating the drive timing information comprises generating the drive timing information using the synchronized clocks and a frame sync signal for displaying images thereon, and
    wherein clocks are Bluetooth clocks, and the drive timing information comprises a count value of the Bluetooth clocks of the display apparatus corresponding to the frame sync signal.

5. The method according to claim 1, wherein the glasses control message further comprises shutter-operation delay information of the active glasses.

6. The method according to claim 5, wherein the shutter-operation delay information comprises delay information regarding a timing between a reference time determined by the drive timing information and a time when a shutter is to be opened or closed.

7. The method according to claim 1,
    wherein the generating the drive timing information comprises generating the drive timing information using the synchronized clocks and a frame sync signal for displaying images thereon, and wherein the glasses control message further comprises frame rate information determined in accordance with the frame sync signal.

8. The method according to claim 1,
wherein the generating the drive timing information comprises generating the drive timing information using the synchronized clocks and a frame sync signal for displaying images thereon, and
wherein the frame sync signal comprises a vertical sync (Vsync) signal of the image.

9. The method according to claim 1, further comprising
acquiring information about a display unit of the display apparatus; and
modifying duty of the drive timing information based on the acquired information about the display unit.

10. A method of controlling active glasses, the method comprising:
transmitting a scanning message for pairing with a display apparatus;
receiving a response message for pairing, from the display apparatus, the response message comprising identification information of the display apparatus;
in response to the receiving the response message, transmitting an acknowledge message for pairing, to the display apparatus, the acknowledge message comprising information about identification of the active glasses;
synchronizing clocks for communicating with the display apparatus;
receiving a glasses control message, generated using the synchronized clocks and comprising drive timing information for driving the shutters of the active glasses, from the display apparatus; and
controlling the shutters to be opened or closed in sync with the drive timing information.

11. The method according to claim 10, wherein the clocks are Bluetooth clocks, and the synchronizing the clocks further comprises receiving a count value of the Bluetooth clocks of the display apparatus from the display apparatus.

12. The method according to claim 11, wherein the count value is received using a reconnection train message for paring between the display apparatus and the active glasses.

13. The method according to claim 11, wherein the drive timing information comprises a count value of the clocks of the display apparatus corresponding to a frame sync signal for displaying images thereon.

14. The method according to claim 13, wherein the frame sync signal comprises a vertical sync (Vsync) signal of the image.

15. The method according to claim 10, wherein the glasses control message further comprises shutter-operation delay information of the active glasses.

16. The method according to claim 15, wherein the shutter-operation delay information comprises delay information regarding a timing between a reference time determined by the drive timing information and a time when a shutter is to be opened or closed.

17. The method according to claim 16, wherein the controlling the shutters to be opened or closed comprises controlling an operation timing and a duty of the shutters based on information about shutter-open delay and information about shutter-close delay.

18. The method according to claim 10, wherein the glasses control message further comprises frame rate information determined in accordance with a frame sync signal for displaying images thereon.

19. The method according to claim 10, wherein the receiving the glasses control message comprises receiving the glasses control message in a longer cycle than a frame sync signal for displaying images thereon to prevent the active glasses from active mode off.

20. The method according to claim 10, further comprising stopping opening or closing the shutters if no glasses control message is received for a preset period of time.

21. The method according to claim 20, wherein the stopping opening or closing the shutters comprises stopping the shutters in an open position.

22. The method according to claim 10, wherein the controlling the shutters to be opened or closed comprises
generating a first clock signal having a frequency which is half of a shutter operating frequency;
generating a second clock signal having a phase which is different from a phase of the first clock signal by a quarter cycle; and
generating a shutter operation driving signal by inverting an XOR value about logic levels of the first and second clock signals.

23. The method according to claim 22, wherein the controlling the shutters to be opened or closed comprises controlling a duty of the shutter operation driving signal by shifting the first clock signal or the second clock signal in accordance with the shutter-operation delay information.

24. A method of controlling a display apparatus, the method comprising:
receiving, from active glasses, a scanning message for pairing with the active glasses;
transmitting, to the active glasses, a response message for pairing, the response message comprising identification information of the display apparatus; and
in response to the transmitting the response message, receiving from the active glasses an acknowledge message for pairing, the acknowledge message comprising information about identification of the active glasses,
wherein the acknowledge message from the display apparatus further comprises pairing success information and information about a state of the active glasses.

25. A display apparatus comprising:
a display unit;
a communication unit which communicates with active glasses; and
a controller which controls the communication unit to receive, from the active glasses, a scanning message for pairing with the active glasses, to transmit, to the active glasses, a response message for pairing, the response message comprising identification information of the display apparatus and, in response to the transmitting the response message, to receive from the active glasses an acknowledge message for pairing, the acknowledge message comprising information about identification of the active glasses,
wherein the acknowledge message from the display apparatus further includes pairing success information and information about a state of the active glasses.

26. A display apparatus comprising:
a display unit;
a communication unit which communicates with active glasses;
a controller which controls the communication unit to receive, from the active glasses, a scanning message for pairing with the active glasses, to transmit, to the active glasses, a response message for pairing, the response message comprising identification information of the display apparatus and, in response to the transmitting the response message, to receive from the active glasses an acknowledge message for pairing, the acknowledge message comprising information about identification of the active glasses;

a signal generator which generates drive timing information for driving shutters of the active glasses using clocks for communicating with the active glasses, wherein the controller controls the communication unit to synchronize the clocks for communicating with the active glasses and to transmit a glasses control message comprising the drive timing information to the active glasses.

27. The display apparatus according to claim 26, wherein the clocks are Bluetooth clocks, and wherein the communication unit transmits a count value of the Bluetooth clocks of the display apparatus to the active glasses so as to synchronize the clocks.

28. The display apparatus according to claim 27, wherein the count value is transmitted using a reconnection train message for paring between the display apparatus and the active glasses.

29. The display apparatus according to claim 26,
wherein the controller controls the signal generator to generate the drive timing information using the synchronized clock and a frame signal for displaying images thereon, and
wherein the clocks are Bluetooth clocks, and the drive timing information comprises a count value of the Bluetooth clocks of the display apparatus corresponding to the frame sync signal.

30. The display apparatus according to claim 26, wherein the glasses control message further comprises shutter-operation delay information of the active glasses.

31. The display apparatus according to claim 30, wherein the shutter-operation delay information comprises delay information regarding a timing between a reference time determined by the drive timing information and a time when a shutter is to be opened or closed.

32. The display apparatus according to claim 26,
wherein the controller controls the signal generator to generate the drive timing information using the synchronized clock and a frame signal for displaying images thereon, and
wherein the glasses control message further comprises frame rate information determined in accordance with the frame sync signal.

33. The display apparatus according to claim 26,
wherein the controller controls the signal generator to generate the drive timing information using the synchronized clock and a frame signal for displaying images thereon, and
wherein the frame sync signal comprises a vertical sync signal (Vsync) of the image.

34. The display apparatus according to claim 26, wherein the controller acquires information about the display unit, and modifies duty of the drive timing information based on the acquired information about the display unit.

35. A method of controlling active glasses, the method comprising:
transmitting a scanning message for pairing with a display apparatus;
receiving a response message for pairing, from the display apparatus, the response message comprising identification information of the display apparatus;
in response to the receiving the response message, transmitting an acknowledge message for pairing, to the display apparatus, the acknowledge message comprising information about identification of the active glasses; and if two or more response messages are received from two or more display apparatuses, selecting a display apparatus that transmitted a response message having a highest received signal strength indication (RSSI) value of RSSI values of the two or more response messages.

36. A method of controlling active glasses, the method comprising:
transmitting a scanning message for pairing with a display apparatus;
receiving a response message for pairing, from the display apparatus, the response message comprising identification information of the display apparatus;
in response to the receiving the response message, transmitting an acknowledge message for pairing, to the display apparatus, the acknowledge message comprising information about identification of the active glasses; and
if no response message is received, repeating transmitting the scanning message or pairing with a display apparatus for a predetermined period of time.

37. A method of controlling active glasses, the method comprising:
transmitting a scanning message for pairing with a display apparatus;
receiving a response message for pairing, from the display apparatus, the response message comprising identification information of the display apparatus; and
in response to the receiving the response message, transmitting an acknowledge message for pairing, to the display apparatus, the acknowledge message comprising information about identification of the active glasses,
wherein the acknowledge message from the display apparatus further includes pairing success information and information about a state of the active glasses.

38. A method of controlling active glasses, the method comprising:
transmitting a scanning message for pairing with a display apparatus;
receiving a response message for pairing, from the display apparatus, the response message comprising identification information of the display apparatus; and
in response to the receiving the response message, transmitting an acknowledge message for pairing, to the display apparatus, the acknowledge message comprising information about identification of the active glasses,
wherein the response message from the display apparatus further includes received signal strength indication (RSSI) value information.

39. A method of controlling active glasses, the method comprising:
transmitting a scanning message for pairing with a display apparatus;
receiving a response message for pairing, from the display apparatus, the response message comprising identification information of the display apparatus;
in response to the receiving the response message, transmitting an acknowledge message for pairing, to the display apparatus, the acknowledge message comprising information about identification of the active glasses;
receiving a glasses control message from the display apparatus, the glasses control message comprising drive timing information for driving shutters of the active glasses; and controlling the shutters to be opened or closed in sync with the drive timing information obtained from the glasses control message.

40. The method according to claim 39, further comprising:
receiving a reconnection train message comprising a count value of a Bluetooth clock of the display apparatus;
determining a current count value of the Bluetooth clock of the display apparatus; and
generating a local clock signal using a local oscillator according to the determined current count value of the Bluetooth clock of the display apparatus such that the local clock signal is synchronized with the Bluetooth clock of the display apparatus.

41. The method according to claim 40, wherein the drive timing information is generated by the display apparatus using a synchronized clock signal and a frame sync signal for displaying images thereon.

42. Active glasses comprising:
a communication unit which communicates with a display apparatus;
a shutter unit which comprises a left-eye shutter and a right-eye shutter to be alternately opened and closed; and
a controller which controls the communication unit to transmit a scanning message for pairing with a display apparatus, to receive a response message for pairing from the display apparatus, the response message comprising identification information of the display apparatus and, in response to the receiving the response message, to transmit an acknowledge message for pairing to the display apparatus, the acknowledge message comprising information about identification of the active glasses,
wherein, if no response message is received, the communication unit repeats transmitting the scanning message for pairing with a display apparatus for a predetermined period of time.

43. Active glasses comprising:
a communication unit which communicates with a display apparatus;
a shutter unit which comprises a left-eye shutter and a right-eye shutter to be alternately opened and closed; and
a controller which controls the communication unit to transmit a scanning message for pairing with a display apparatus, to receive a response message for pairing from the display apparatus, the response message comprising identification information of the display apparatus and, in response to the receiving the response message, to transmit an acknowledge message for pairing to the display apparatus, the acknowledge message comprising information about identification of the active glasses,
wherein the acknowledge message from the display apparatus further comprises pairing success information and information about a state of the active glasses.

44. Active glasses comprising:
a communication unit which communicates with a display apparatus;
a shutter unit which comprises a left-eye shutter and a right-eye shutter to be alternately opened and closed; and
a controller which controls the communication unit to transmit a scanning message for pairing with a display apparatus, to receive a response message for pairing from the display apparatus, the response message comprising identification information of the display apparatus and, in response to the receiving the response message, to transmit an acknowledge message for pairing to the display apparatus, the acknowledge message comprising information about identification of the active glasses,
wherein the response message from the display apparatus further comprises threshold received signal strength indication (RSSI) value information.

45. Active glasses comprising:
a communication unit which communicates with a display apparatus;
a shutter unit which comprises a left-eye shutter and a right-eye shutter to be alternately opened and closed; and
a controller which controls the communication unit to transmit a scanning message for pairing with a display apparatus, to receive a response message for pairing from the display apparatus, the response message comprising identification information of the display apparatus and, in response to the receiving the response message, to transmit an acknowledge message for pairing to the display apparatus, the acknowledge message comprising information about identification of the active glasses,
wherein the communication unit receives a glasses control message, which comprises drive timing information for driving shutters of the active glasses, from the display apparatus, and the control unit controls the shutters to be opened or closed in sync with the drive timing information obtained from the glasses control message.

46. The active glasses according to claim 45, wherein the communication unit receives a reconnection train message comprising a count value of a Bluetooth clock of the display apparatus, and
the control unit determines a current count value of the Bluetooth clock of the display apparatus and generates a local clock signal using a local oscillator according to the determined current count value of the Bluetooth clock of the display apparatus, such that the local clock signal is synchronized with the Bluetooth clock of the display apparatus.

47. The active glasses according to claim 46, wherein the drive timing information is generated by the display apparatus using a synchronized clock signal and a frame sync signal for displaying images thereon.

48. Active glasses comprising:
a communication unit which communicates with a display apparatus;
a shutter unit which comprises a left-eye shutter and a right-eye shutter to be alternately opened and closed; and
a controller which controls the communication unit to transmit a scanning message for pairing with a display apparatus, to receive a response message for pairing from the display apparatus, the response message comprising identification information of the display apparatus and, in response to the receiving the response message, to transmit an acknowledge message for pairing to the display apparatus, the acknowledge message comprising information about identification of the active glasses,
wherein the control unit synchronizes clocks for communicating with the display apparatus, controls the communication unit to receive a glasses control message, generated using the synchronized clocks and comprising drive timing information for driving shutters of the active glasses, from the display apparatus, and controls the shutters to be opened or closed in sync with the received drive timing information.

49. The active glasses according to claim 48, wherein the clocks are Bluetooth clocks, and wherein the controller synchronizes the Bluetooth clocks by receiving a count value of the clocks of the display apparatus from the display apparatus.

50. The active glasses according to claim 49, wherein the count value is received using a reconnection train message for paring between the display apparatus and the active glasses.

51. The active glasses according to claim 49, wherein the drive timing information comprises a count value of the clocks of the display apparatus at a point of time related to a frame sync signal of a displayed image.

52. The active glasses according to claim 51, wherein the frame sync signal comprises a vertical sync (Vsync) signal of the image.

53. The active glasses according to claim 48, wherein the glasses control message further comprises shutter-operation delay information of the active glasses.

54. The active glasses according to claim 53, wherein the shutter-operation delay information comprises delay information regarding a timing between a reference time determined by the sync signal and a time when a shutter is opened or closed.

55. The active glasses according to claim 53, wherein the controller controls the shutters to be opened or closed by controlling an operation timing and a duty of the shutters based on information about shutter-open delay and information about shutter-close delay.

56. The active glasses according to claim 48, wherein the glasses control message further comprises frame rate information determined by a frame sync signal of a displayed image.

57. The active glasses according to claim 56, wherein the glasses control message is received in a longer cycle than the frame sync signal to prevent the active glasses from active mode off.

58. The active glasses according to claim 48, wherein the controller controls the shutter unit to stop opening or closing the shutters if no glasses control message is received for a preset period of time.

59. The active glasses according to claim 58, wherein the controller stops opening or closing the shutters by stopping the shutters in an open position.

60. The active glasses according to claim 48, wherein the controller controls the shutters to be opened or closed by
generating a first clock signal having a frequency which is half of a shutter operating frequency;
generating a second clock signal having a phase which is different form a phase of the first clock signal by a quarter cycle; and
generating a shutter operation driving signal by inverting an XOR value about logic levels of the first and second clock signals.

61. The active glasses according to claim 60, wherein the controller controls the shutters to be opened or closed by controlling a duty of the shutter operation driving signal by shifting the first clock signal or the second clock signal in accordance with the shutter-operation delay information.

* * * * *